US007421449B2

(12) United States Patent
Williams et al.

(10) Patent No.: US 7,421,449 B2
(45) Date of Patent: Sep. 2, 2008

(54) SYSTEMS AND METHODS FOR MANAGING A LIFE JOURNAL

(75) Inventors: Shane F. Williams, Seattle, WA (US); Steven J. Ball, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 11/033,684

(22) Filed: Jan. 12, 2005

(65) Prior Publication Data

US 2006/0156245 A1 Jul. 13, 2006

(51) Int. Cl.
*G06F 7/00* (2006.01)
(52) U.S. Cl. ......................................... 707/102; 707/3
(58) Field of Classification Search ............... 707/3–10, 707/100, 101
See application file for complete search history.

(56) References Cited

U.S. PATENT DOCUMENTS

| 2001/0018693 | A1 | 8/2001 | Ramesh et al. | |
| 2002/0019833 | A1 | 2/2002 | Hanamoto | |
| 2003/0117428 | A1 | 6/2003 | Li Dongge et al. | |
| 2004/0153445 | A1* | 8/2004 | Horvitz et al. ................. | 707/3 |
| 2005/0091596 | A1* | 4/2005 | Anthony et al. ............. | 715/712 |
| 2005/0105396 | A1* | 5/2005 | Schybergson ................ | 368/12 |
| 2005/0187943 | A1* | 8/2005 | Finke-Anlauff et al. ..... | 707/100 |

OTHER PUBLICATIONS

European Search Report dated Jun. 9, 2006, mailed Sep. 7, 2006 for European Patent Application Serial. No. 05112483, 9 pages.
Sudarsky, et al. "Visualizing Electronic Mail" (Jul. 12, 2002) Proceedings of the Sixth International Conference on Information Visualization, pp. 1-7.
Plaisant, et al. "LifeLines: Visualizing Personal Histories" (Apr. 18, 1996) ACM CHI96 Conference Proceedings, pp. 1-9.

\* cited by examiner

*Primary Examiner*—Wilson Lee
(74) *Attorney, Agent, or Firm*—Amin, Turocy & Calvin, LLP

(57) ABSTRACT

The subject invention provides a unique system and method that facilitates management and navigation of various data objects by making use of a unique time-line based navigation tool. In particular, objects can organized into a plurality of bands based on their respective subject matter. Each band can be created to designate a particular topic. Objects are organized within the appropriate bands based in part on a time parameter such as a time or date that the object was created, for example. The navigation tool allows a user to navigate or browse through the bands and objects according to a desired time parameter or range of time. Zooming and other browsing options are available to the user to view objects of interest at varying levels of detail. The objects are represented as ASCII thumbnails that are operational. Thus, the content of any object can be modified directly via the thumbnail.

20 Claims, 41 Drawing Sheets
(20 of 41 Drawing Sheet(s) Filed in Color)

SYSTEMS AND METHODS FOR MANAGING A LIFE JOURNAL

TECHNICAL FIELD

The subject invention relates generally to navigating through and viewing data and in particular to the visualization and dynamic manipulations of and interactions with data objects maintained and organized using a unique time-line based parameter or tool.

BACKGROUND OF THE INVENTION

In the current computing environment, there are limited viewing, browsing, and file organization techniques available to users. For example, existing applications have largely adopted a tree structure folder format for organizing and displaying various types of files. Though some relationships between folders, subfolders, and files can be viewed, such relationships are limited in scope and are primarily dependent upon explicit user input. For example, files can be related according to their common folder or subfolder as denoted by the user.

Furthermore, viewing or navigating between multiple files within multiple folders or subfolders can be problematic and nearly impracticable due to screen space constraints. Thus, user interaction among multiple active documents is not feasible under current practices. Overall, conventional file and folder organization methods merely provide disparate views of individual files, thereby requiring more user time and resources to process and/or manage files, documents, and the like.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitates navigating and managing of data through the employment of a unique user-interface. More specifically, the data (individually referred to as objects) can be represented in one or more definable categories or bands. Within each band or across multiple bands, objects can be viewed at a range of zoom depths, individually or in related clusters—depending on the zoom depth and the available screen space. Unlike conventional techniques, however, the objects can be arranged according to a time-based parameter which is unique or specific to each object. In addition, browsing of the objects can be accomplished in part by using a time-line based navigation tool. Thus, a user can more readily appreciate and extract the many possible relationships between various objects either within one band or across multiple bands. Users often make non-sensical associations between objects and time. Hence, by allowing users to view and organize objects based on a time element as well as by subject matter, a more rich and meaningful user experience can be had.

According to one aspect of the invention, multiple operations can be performed on one or more objects regardless of the type of object (e.g., picture, document, web page, scanned documents, message, etc.) while viewing the objects. In particular, objects can be viewed as thumbnails, thus the content of many objects can be made visible to the user. Many different types of thumbnails can be employed. One approach involves ASCII thumbnails. An ASCII thumbnail is essentially a text-based summary that defines the essence of the text represented in the larger object. Other possible types of thumbnails include image, audio, video, or other media thumbnails that represent proxy of actual objects. The ASCII (or any other type) thumbnail could also be scaled to show only as much text as can fit in the space available for the thumbnail. The text could scale intelligently as to maximize the meaning for the given display space.

The amount of visible content of each object may depend on the current zoom depth. For example, as a user zooms into a band or group(s) of objects, more content of each object or group can be more easily seen. As the user zooms out, a relatively abstract view and less detail of the object is visible. Moreover, the user can essentially peel back layers of content over any time period, and in doing so, can peel dense objects apart to view in greater detail—largely by employing various zoom buttons or zoom controls on a pointing device or on the display.

In addition to representing the actual object, the thumbnail of an object can also be operational or actionable such that the user can click on it to directly access and/or modify the content of the object. Therefore, a separate application controlling the content (e.g., email program, word processing program, etc.) does not need to be opened or accessed to make or save changes to the content. For example, if the thumbnail indicates a web page, the user could simply click on it and access the particular page. The thumbnails can also be dynamic, whereby as the content of the actual object changes, so does the thumbnail.

As objects are introduced, moved, or copied between bands, metadata according to the respective bands can be annotated to the particular object. Explicit and implicit metadata can be quickly annotated to the object depending on user preferences. For example, the user may provide a title or name to the object (e.g., explicit metadata); or the system, using some form of artificial intelligence, can find related objects and input the appropriate metadata for those related objects (e.g., implicit metadata). Objects or clusters of objects can be annotated with different types of metadata including text, pen, voice, or other audio.

According to another aspect of the invention, one or more objects can be selected and/or viewed in a separate window for use in any number of other applications to which the user may have access. For example, the one or more objects can be selected for modification or for a different type of viewing such as hyper-viewing. Hyper-viewing can allow a user to roll through a relatively large number of objects in a very rapid manner in order to converge on a particular object of interest. In practice, for instance, the user may be able to view as few as 10 or as many as 10,000 objects using this hyper-view technique. The user may also be able to readily flag or mark an object of interest or at a particular point of the hyper-view to focus in on a particular subset of objects at a later time.

As previously mentioned, the objects are organized within bands according to a time-based navigation tool. For instance, multiple bands can be created along a y-axis of the screen such as in a stack formation. The bands can also be arranged relative to the time-based navigation tool to facilitate a blogging environment, wherein a user's feedback or comments can represent an object and thus can be entered at the relevant time directly into the band.

In general, at least some content of all or at least a subset of the available bands can be viewed on the screen at the same time. For instance, the content may not be discernible objects or thumbnails but may instead be an indicator to inform the user that some objects are present at the site of the indicator. However, when the screen space does not permit all of the desired bands to be visible at once, the user can simply scroll (e.g., vertically) through them such that as a band falls off the bottom of the screen, it can reappear at the top of the screen. Bands can also be removed from the screen based on age or time it was last accessed as determined by user preferences.

Each band can be defined by a name and/or one or more properties (e.g., metadata) that are extracted from the metadata associated with the objects contained therein or identified by the user. Similar to common tree structure views, the bands can be collapsed or expanded. However, when fully collapsed, some information about the content of each band can still be obtained by making use of another axis (e.g., x-axis). This is accomplished in part by monitoring and tracking the presence and/or density of objects maintained in any band. To the user, this data can be represented as sinusoidal curves in each respective band, whereby the amplitude and/or color opaqueness can indicate a relative number of objects or a relative size of the objects located at a particular time or time period (e.g., year, month, week, day, hour, etc.). Alternatively, non-sinusoidal shapes can represent object density. For example, triangles, ellipsoidal curves, and icons that are may or may not be mathematically generated can be employed. Thus, even when the bands are collapsed or closed, the user can still abstract or extract information from them by taking advantage of the density indicators in combination with the time parameter.

According to another aspect of the subject invention, objects can be clustered particularly when they are closely related to one another. However, due to their potential large size (e.g., in terms of number of objects in the cluster), cluster visibility may be hindered depending on the zoom depth. To address this scenario, a user or the system can intelligently select one object from the cluster that is most representative of the cluster to represent the cluster. The other objects can be found "behind" the representative object and rolled through using a mouse-over and roll operation, for example. More important clusters of objects can be given specific labels which can remain on-screen and visible in the band regardless of the zoom depth. By simply clicking on the label, the cluster can be visualized and zoomed-in for a further detailed viewing. Less important clusters can also be labeled but their assigned level of importance will be lower and thus may be overlapped by clusters having a higher importance value and their respective labels.

Due to relatively high object densities at various times throughout a user's personal time line (e.g., holidays, work events, trips, etc), visibility of the objects at any zoom depth can be problematic. Thus, to optimize the visibility of objects, the user can prioritize objects and/or clusters of objects. For example, the existence of objects or clusters of objects with a lower importance value can be indicated by an icon (e.g., drop-down arrow) or other graphic to illustrate the number of objects collapsed at that particular time. Objects with a higher importance value can be immediately visible to the user when the appropriate zoom depth is reached. Overlapping objects or cluster labels can also be made somewhat transparent. Allowing some degree of transparency of or between objects and/or labels that partially overlap one another is particularly beneficial to the user. Instead of hiding potentially important information from the user, the information is still available to the user.

Various aspects of the subject invention as discussed above can support a variety of object types including but not limited to email, music, documents, pictures, video, television and/or cable programs, computing applications, scanned-in documents, web pages or URLs, hyperlinks, voice messages, contacts, address information, maps, receipts, transaction records, banking records, and/or any other type of data. Navigation of the bands such as within a band across periods of times or zooming in and out of objects, bands, or time frames can be accomplished in part by employing various audio commands, eye-tracking, or pointing devices. In addition, viewing of object(s) of greater interest via zooming can be further optimized by allowing surrounding objects of lesser interest to scale down and migrate to the edges of the screen) along the x-axis, for example. On-screen navigational buttons can also assist in the visualization of the desired content in one particular band or across a plurality of bands at the same time.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
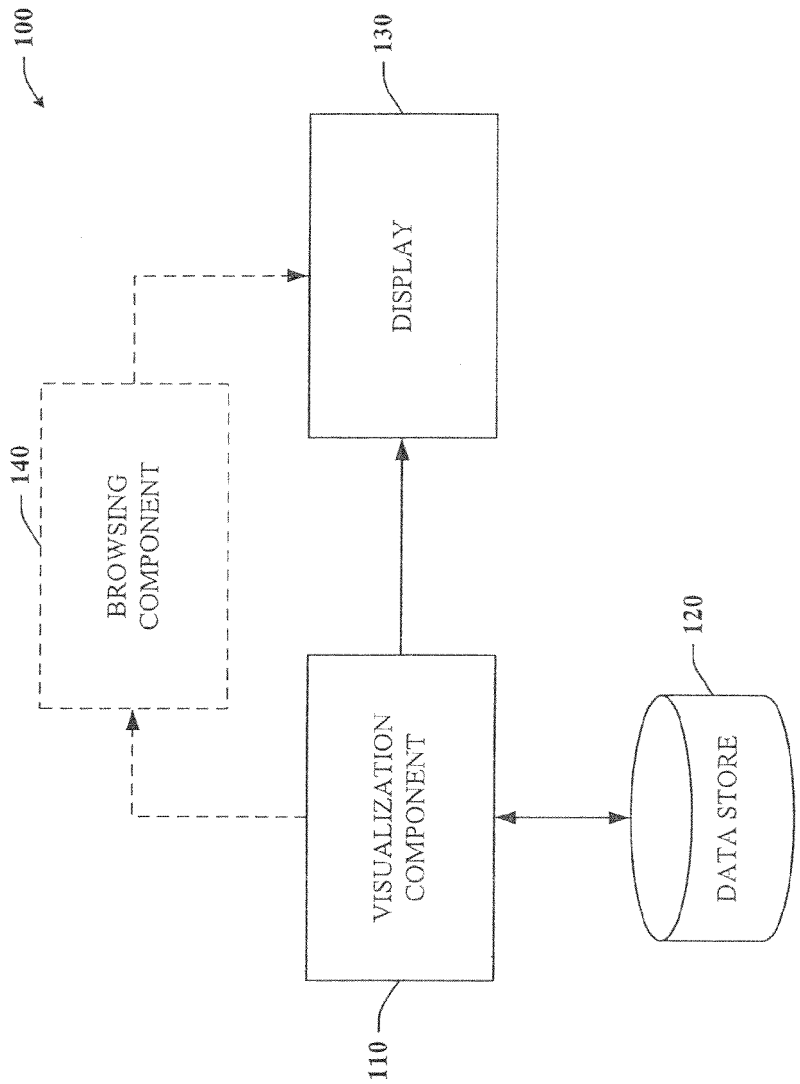
FIG. 1 is a block diagram of an object management and navigation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In general, the subject invention can incorporate various inference schemes and/or techniques in connection with annotating objects as they are introduced into one or more bands. In addition, various inference schemes can be applied to or employed in connection with grouping or finding related objects based in part on any one of the following: similar metadata, similar images (e.g., via image recognition techniques), similar faces (e.g., via facial recognition techniques), similar handwriting (e.g., via handwriting recognition), similar text (e.g., via optical character recognition), similar watermarks, and/or similar audio patterns (e.g., via audio fingerprinting, audio-to-text, and/or audio-to-music score recognition algorithms). It should be understood that the previous list is not exhaustive and that other similarities may be considered.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a general block diagram of a unique and powerful system 100 that facilitates navigation and management of various types of objects (data) in accordance with an aspect of the subject invention. The system 100 includes a visualization component 110 that can access and/or retrieve objects maintained in a data store 120 and that can arrange them visually by subject matter and time based at least in part upon a user-defined property or metadata associated therewith. The visualization component 110 can organize the objects into any number of bands according to the similarities or commonalities among the objects' properties or metadata. For example, each band can represent a specific subject matter (e.g., family, house, trips, etc.)

Within each band, the visualization component 110 can organize or position the one or more objects in the respective bands according to a time-based parameter. The time-based parameter can correspond to an object's creation date or the date/time that an event represented in the object occurred. For example, pictures of a July $4^{th}$ trip to the islands can be grouped in one band (e.g., named Trips) and localized around July 3-5, 2004—the dates of the trip. Similarly, the user's trip taken months later over the Thanksgiving holiday can be localized around the appropriate November dates.

The bands along with their corresponding objects can be viewed and/or manipulated on a display 130 by the user. As discussed below, the objects included in each band can be represented in a variety of ways to keep the user aware of their presence within the respective band while also optimizing the visibility of the user's objects of interest.

The system 100 can also include a browsing component 140 that allows a user to more readily browse through bands of objects to establish or discover additional relationships or associations between objects within any one band or across multiple bands. Any such associations resulting from the browsing component can also be shown on the display 130 in various ways as determined by the user.

Figure 2:
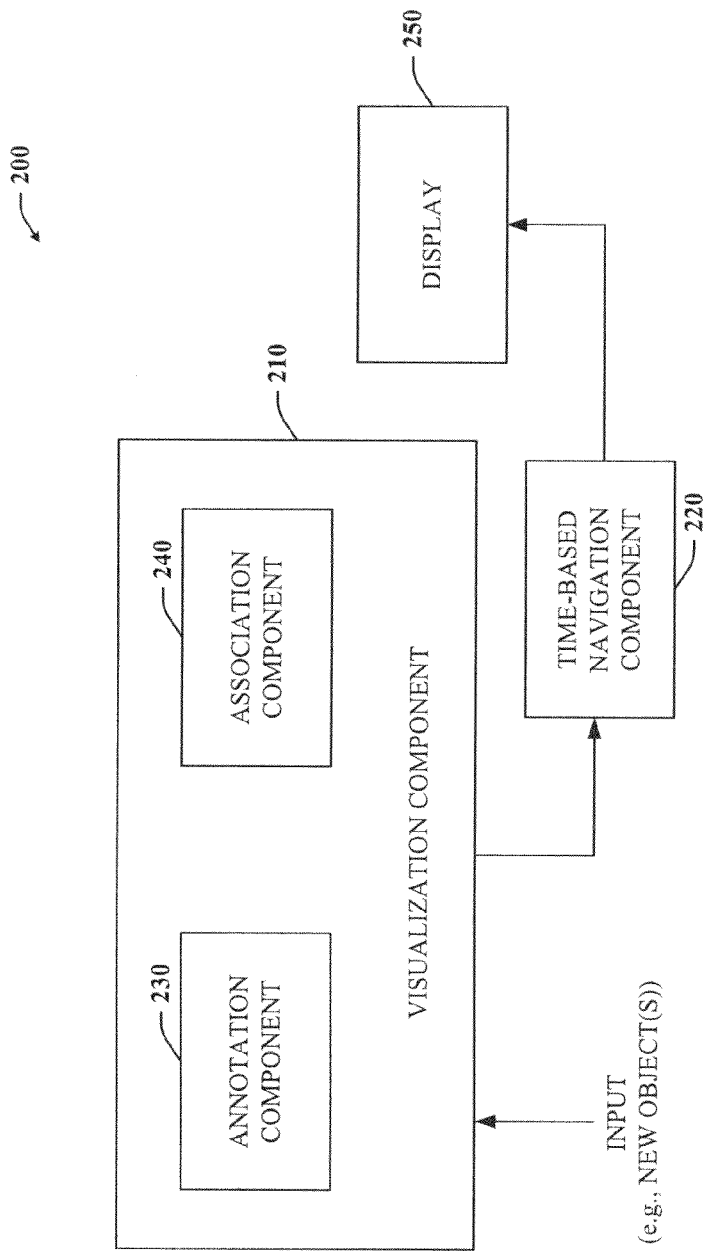
FIG. 2 is a block diagram of an object management and navigation system in accordance with another aspect of the subject invention.

Referring now to FIG. 2, there is illustrated a block diagram of a system 200 that facilitates a novel approach to the navigation and management of objects in accordance with an aspect of the subject invention. The system 200 includes a visualization component 210 that receives user-based input such as one or more objects to manage and processes them before they can be browsed via a time-based navigation component 220.

In particular, the visualization component 210 can include a plurality of sub-components such as an annotation component 230. The annotation component 230 can annotate any objects newly introduced to a band or group of objects based on the metadata associated with the band or group as well as explicit user input. In general, an annotation can be a user or machine applied modification to an object that further gives it meaning, context, richness, or detail that enhances the intellectual, physical, or emotional value of the original object. For example, a user can specifically annotate the object by giving the object a name or title or by assigning a time or date to the object. Annotation can also be in the form of user comments relating to the object or to the band. Comments or other information annotated to a band can also be automatically annotated to each object or group of objects located in that band.

Also included in the visualization component 210 is an association component 240. The association component can associate objects with similar metadata or with a minimum threshold of similar metadata within a band, for example. As a result, such related objects can be identified by the particular band as a cluster of more closely related objects within the band. Associations can also be performed across multiple bands to find related objects stored in different bands.

The time-based navigation component 220 can further facilitate the visualization of objects on a display 250 to the user according to a time parameter. More specifically, the time-based navigation component 220 allows a user to navigate through objects within any one band or across more than one band at the same time according to any time parameter such as multiple years, one year, month, week, day, hour, decades, and/or other useful time divisions. Thus, by simply gesturing through any particular band across the visible timeline (such as with the use of a pointing device, scrolling mechanism or other gestural scrolling mechanism), the user can readily and rapidly view objects as they took place in the user's life. For example, imagine that a user were to employ the system 200 to maintain a journal or diary of his/her life's events over a 20 year period—beginning 10 years ago and ending 10 years from now. The user may desire to include photos, trip itineraries, maps, and tourist attractions for any vacations taken or planned, general family photos, pet information such as doctor receipts and exam results, general house information, songs, recordings, captured audio clips, contact information, addresses, GPS coordinates, documents, etc. The type of information is practically without end.

As objects such as photos, receipts, or any other type of document is added by the user, they can be annotated and associated into the appropriate bands. Of course, the bands can be named accordingly such as "pet", "vacations", "family", "friends", "work", "home", "school", "hobbies", "music", "project", etc. to properly identify the subject matter.

Figure 3:
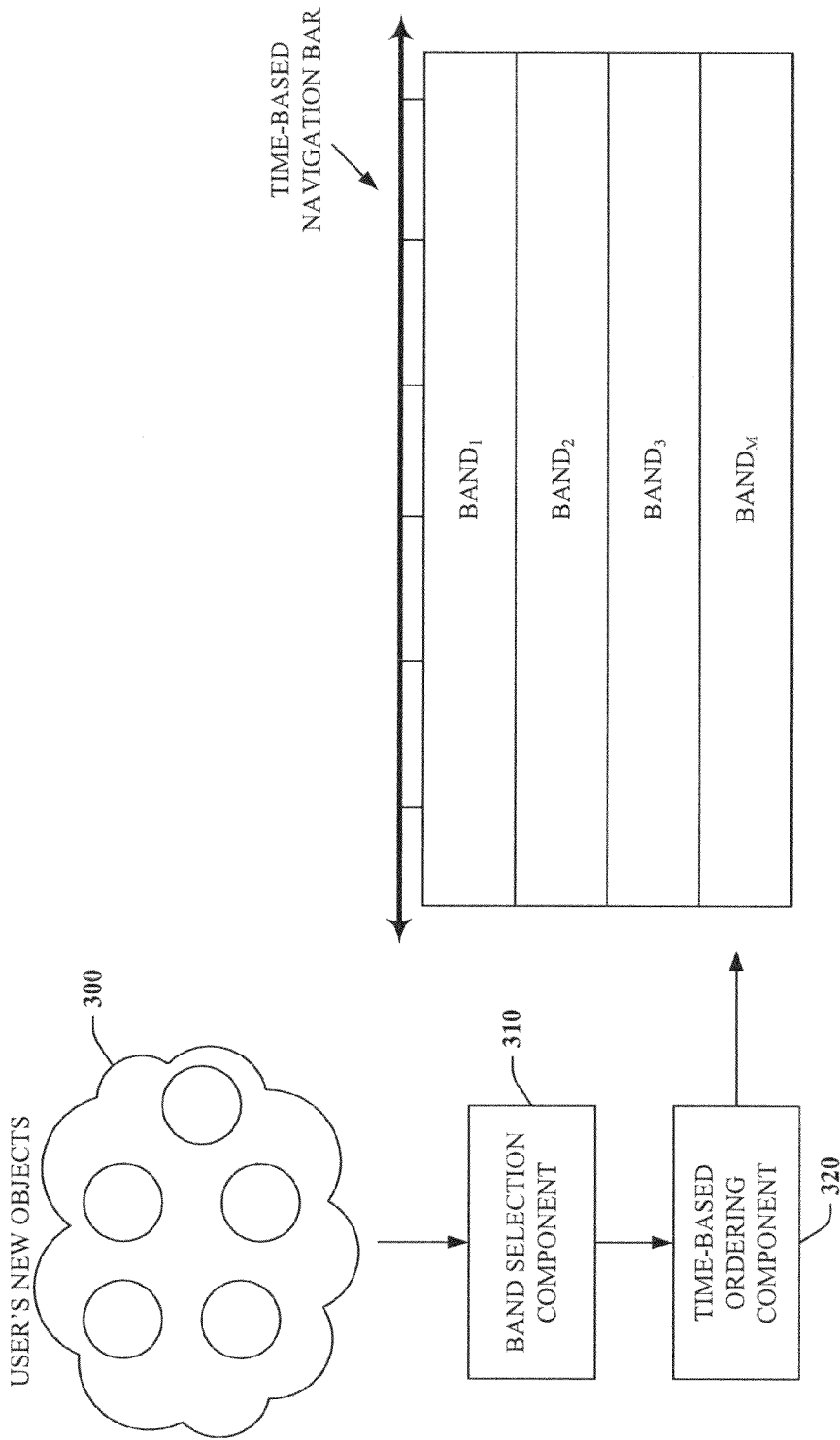
FIG. 3 is a block diagram illustrating the organization of objects in an exemplary object management and navigation system in accordance with yet another aspect of the subject invention.
Figure 4:
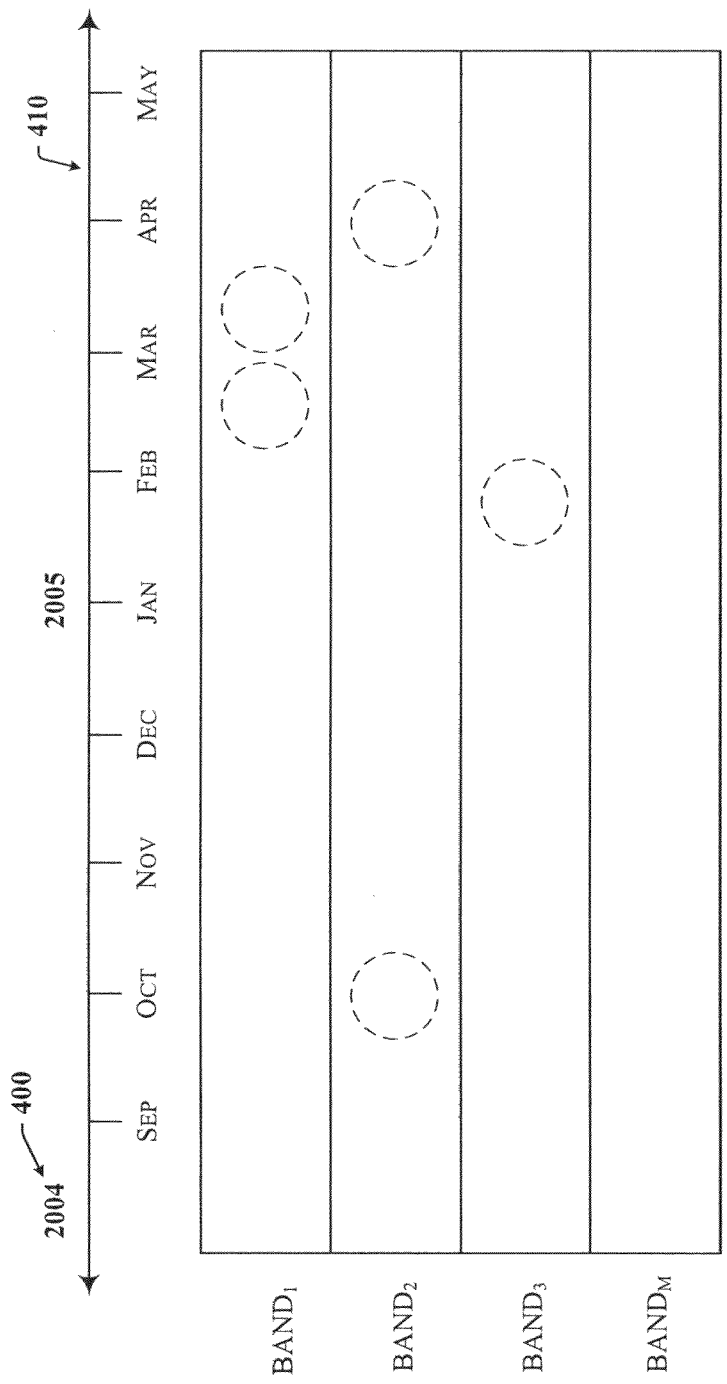
FIG. 4 is a block diagram demonstrating the resulting organization of objects from FIG. 3 in accordance with still another aspect of the subject invention.

The following several figures provide further details with respect to the organization of objects into bands and their navigation based on time parameters. For instance, FIGS. 3 and 4 schematically represent the addition of objects to any band. In FIG. 3, suppose that a user has a plurality of objects 300 that he/she wishes to manage in this navigable space. The objects 300 interact with a band selection component 310 that can determine which band to place the respective objects 300 in based on the objects themselves and any metadata associated therewith. The band selection process can take place implicitly in an automated fashion using artificial intelligence (e.g., algorithms, inference schemes, etc.) or manually by explicit user input. Thereafter, a time-based navigation component 320 can be employed to move about the objects in any desired bands to view the content thereof at the desired date or range of time.

It should be appreciated that new bands can be created, deleted, moved to different locations on the screen space, and re-ordered so that certain bands appear adjacent to one another (e.g., alphabetical order, chronological order by creation date or modification date, etc.) by dragging the bands. Similarly, objects can be readily moved or copied to different bands at the user's will by dragging, for example, or by employing other suitable commands or options to perform the desired operation.

FIG. 4 demonstrates the results of the action in FIG. 3. As can be seen, a time parameter 400 (e.g., month and year reference) has been indicated on the time-based navigation bar 410. In addition, the objects have been associated with their respective bands and positioned along the band at their respective dates. As will be discussed in FIG. 5, infra, bands and the objects therein can be viewed at many zoom levels or depths depending on user preferences. Thus, as shown in FIG. 4, the objects depicted herein may or may not be visible to the user.

Figure 5:
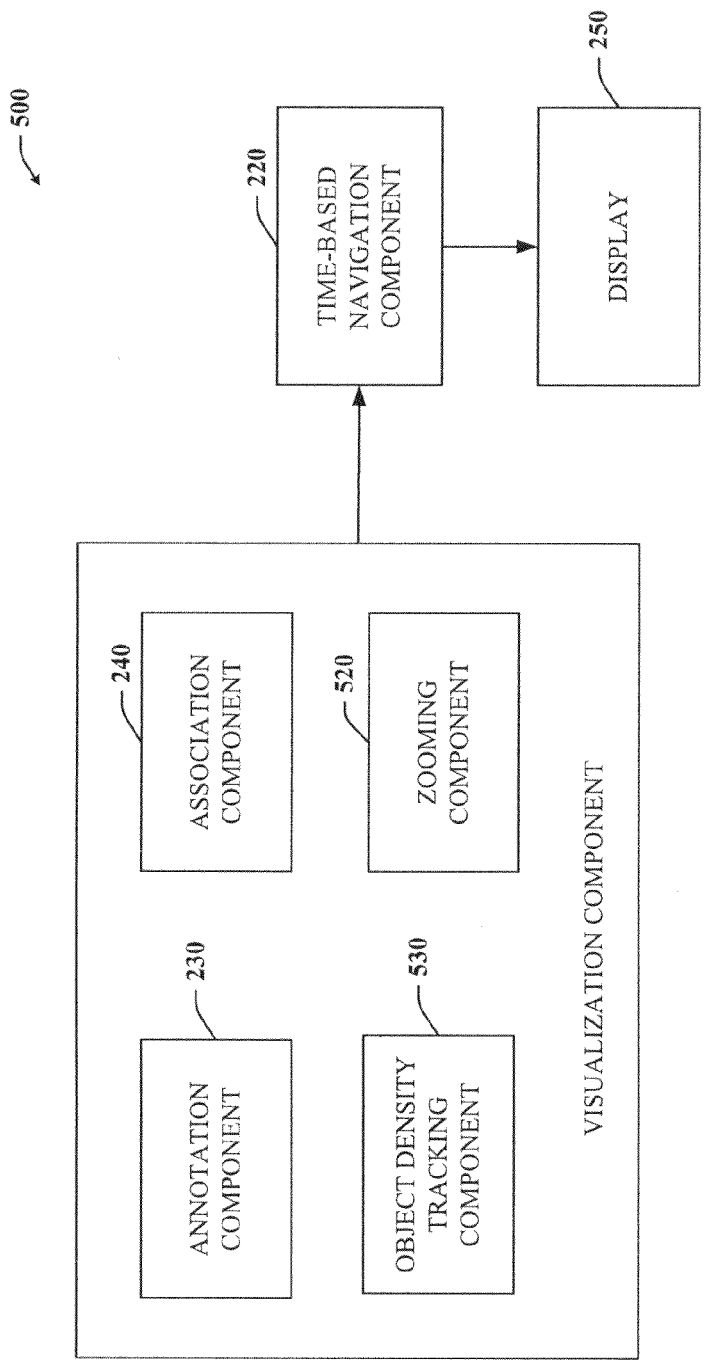
FIG. 5 is a block diagram of an object management and navigation system in accordance with an aspect of the subject invention.

Turning now to FIG. 5, there is a block diagram of a system 500 that further facilitates object management and navigation using a unique user-interface in accordance with an aspect of the subject invention. The system 500 is similar to the system 200 in FIG. 2, supra. In addition, however, a visualization component 510 also includes a zooming component 520 and an object density tracking component 530—each of which assists in the viewability of the band content and/or particular objects therein.

The zooming component can have dual functionalities. In one aspect, the zooming component 520 can facilitate zooming along the x-axis. In particular, the zooming component 520 can zoom in or out of the x-axis parameter (e.g., time) at various zoom depths such as by using a mouse wheel on a wheel-enabled mouse. For example, a downward motion zooms out to a greater range of time showing on the screen and thus less visible detail of each band or object. Likewise, an upward motion of the wheel zooms (e.g., in) into a more specific time frame, thus allowing a greater detailed view of one or more bands or objects in that time frame. Zooming can also be accomplished by navigational buttons (e.g., D—Day, W—Week, M—Month, Y—Year, 3 year, etc.) that may be included in a tool bar or by "−" and "+" indicators located on each band (see FIGS. 17-19, infra).

In another aspect, the zooming component 520 can facilitate zooming along the y-axis. More specifically, the zooming component 520 can zoom in or out of band to essentially expand or collapse the band. For example, opening the band in the vertical dimension to view any objects therein can be accomplished by clicking and dragging down in the lower half of the band or dragging up in the upper half of the band. Thus, it is possible to keep either an upper or lower portion of the band compressed to provide more screen space when viewing the other of the two portions (e.g., upper or lower) of the band. To expand the upper and lower portions at the same time, the time bar defining the upper and lower portions can be grabbed with an upward motion. To close both portions at the same time, the time bar can be grabbed with a downward motion (using a pointing device).

Furthermore, when viewing one band in particular (Band A), the y-axis dimension of other bands can be reduced automatically if the user resizes Band A with focus or by dragging. In general, as the bands are opened wider and wider, the corresponding objects can become larger such that more details of each object can be seen. Because screen space is finite, any other bands may become more compressed to make room for the expansion of the one band. Alternatively or in addition, all bands can be assigned to the same width by invoking a function key or auto-zoom key assigned to remember current zoom settings. To further conserve valuable screen space, bands can also be made to automatically hide or temporarily disappear from the screen to facilitate creating desktop space when any such band is not in use.

Figure 6:
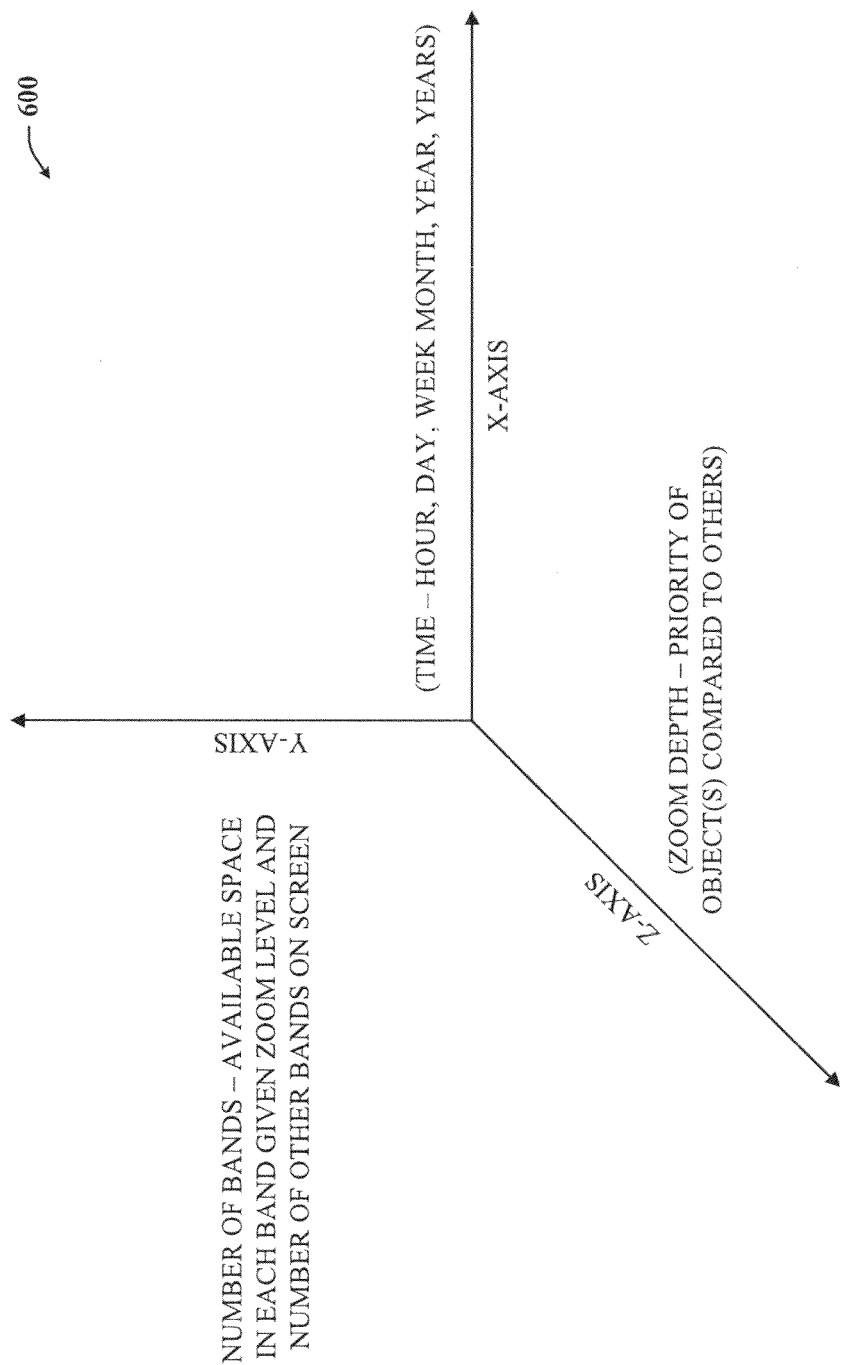
FIG. 6 is a diagram illustrating exemplary definitions of the x-, y-, and z-axes in accordance with an aspect of the subject invention.

To provide further context to the space utilization and architectural layout of the system 500 on any display screen, FIG. 6 demonstrates an exemplary representation of each axis. For instance, the bands can be arranged along the y-axis, whereby the amount of each band shown at any one time can depend on the total available screen space given a particular zoom depth of any of the bands and the number of bands the user desires to view on the screen. The zoom depth can be represented on the z-axis since when zooming on a particular band or time within a band, the objects of interest enlarge, and the surrounding objects not of interest can appear to diminish in size relative to the enlarged objects. Furthermore, some objects may be more important to the user (e.g., given a higher importance value in terms of visibility). Thus, when generally viewing the objects in the band, some objects can be rendered to appear at least partially in front of less important objects.

When navigating through the band at various levels of detail, the system 500 or user can determine which content to view using one or more selection algorithms. One version of the selection algorithm relies on the following: each band can be made up of a tree-type structure having a number of fixed nodes. The tree may be sparse meaning that not all nodes are or must be populated. Movement up and down the tree is also possible.

Each node up the tree contains a summarization of the node below it, which means that when the user zooms out of a band, the zooming component, for example, can walk through these nodes at a certain level without needing to process each node below. That is, rather than performing the more time-consuming task of processing each node below in its entirety, the summary of each node can be relied upon. When a set threshold for each node is crossed, the zooming component can move up or down a node depending on whether the threshold crossed belongs to a node below or above. Furthermore, each summary can indicate a level of importance and can include a set of properties. Importance can be based on explicitly-entered properties or in part by heuristic-based properties. For instance, the number of clicks detected can increase the importance for a particular item in the node. Moreover, the summary can be dynamic or static as determined by the user or system parameters.

Depending on the application in which the system 500 is employed, the axes can be changed. For example, in a blogging environment, the time parameter can be represented on the y-axis and annotations can be made by the user at particular times or dates, all of which can be scalable, browsable, and/or zoomable as previously discussed.

Referring again to FIG. 5, the object density tracking component 530 provides a unique peak into each band on the screen. In particular, when bands are at least partially compressed such that individual objects are no longer visible, the user can still extract information from the bands such as a relative quantity of objects positioned at a particular time or over a particular time period. Additionally, the user may be able to determine relative size or storage consumption that the objects are utilizing at any given time within the band. Both of these attributes can be accomplished in part by the object density tracking component 530. The object density tracking component essentially measures at least one of the following: the number of objects located throughout the band or the relative size of each object in the band. By converting the measurements to a representative sinusoidal curve in the respective bands, the user can quickly assess the state of each band.

Figure 7:
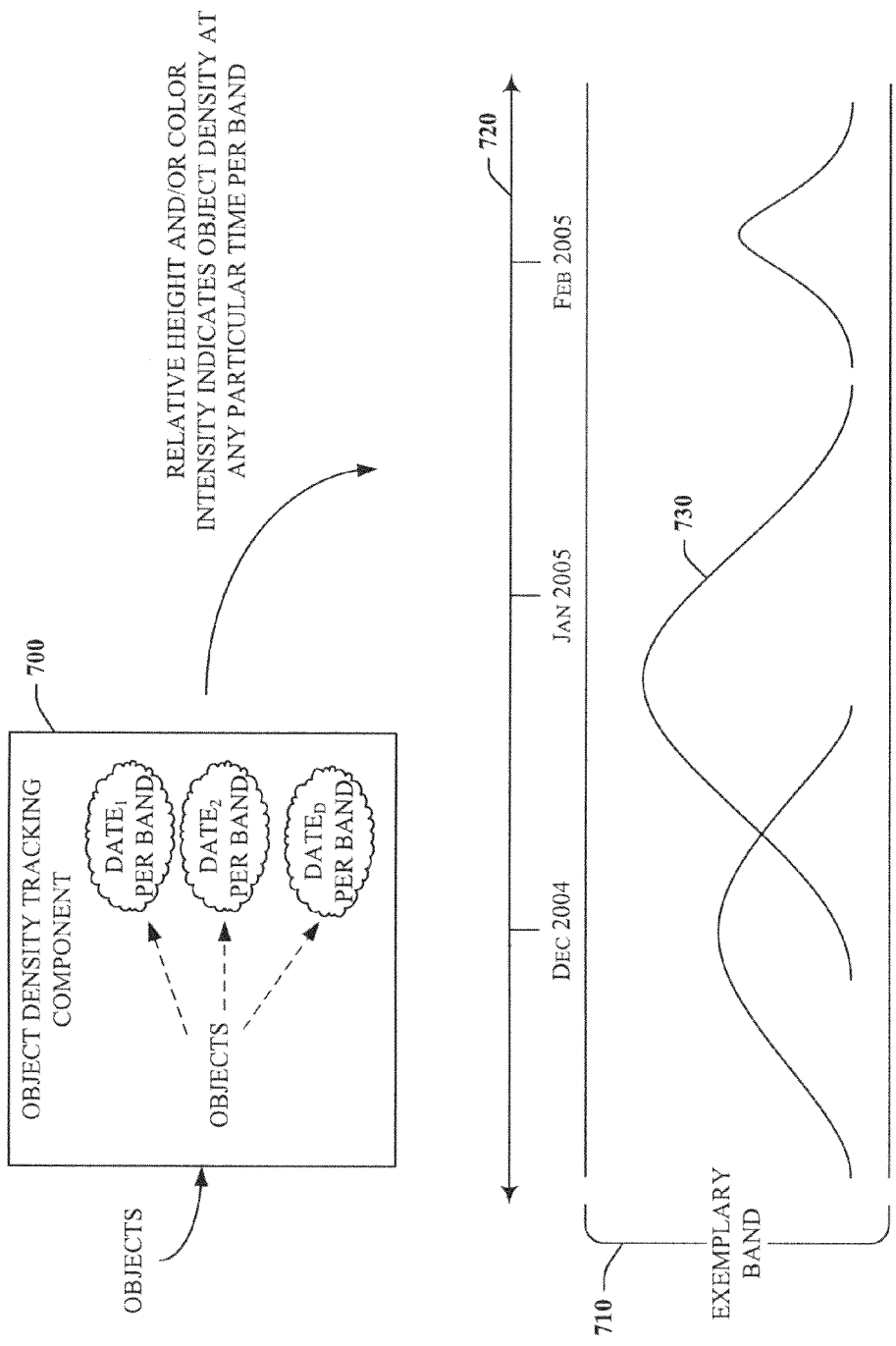
FIG. 7 is a block diagram demonstrating the operation of an object density tracking component from FIG. 5 in accordance with an aspect of the subject invention.

For instance, FIG. 7 schematically demonstrates the relative height and/or color intensity that can indicate object density at any particular time per band. As shown, the tracking component 700 tracks the time location or position of each object per band 710. A time-based navigation bar 720 can remain on-screen and placed alongside the band 710 to provide an easy and accurate frame of reference. When the band is on-screen, the user can readily ascertain that based on the height of the sinusoidal curve 730 (or some other function-derived shape), some quantity of objects is present at a particular time of the year, month, day, hour, or week, depending on the x-axis parameter. As a result, the user can quickly assess activity levels during a particular time or time period of their life, etc. Moreover, the content included in each band essentially never disappears from view unless the user modifies band settings. That is, some context can be seen at any zoom depth of the band.

Figure 8:
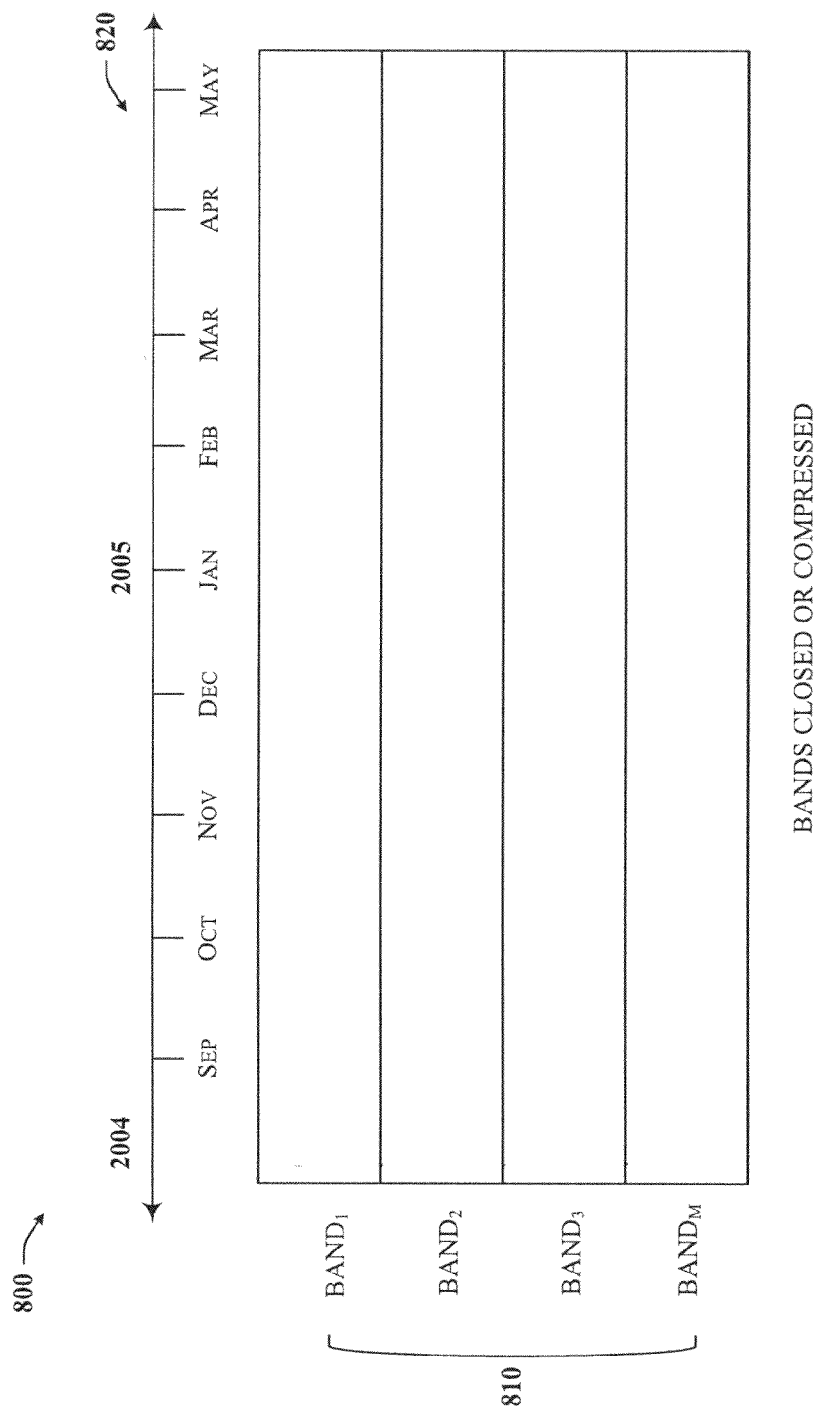
FIGS. 8-10 are schematic diagrams depicting the opening of at least one band in accordance with an aspect of the subject invention.
Figure 9:
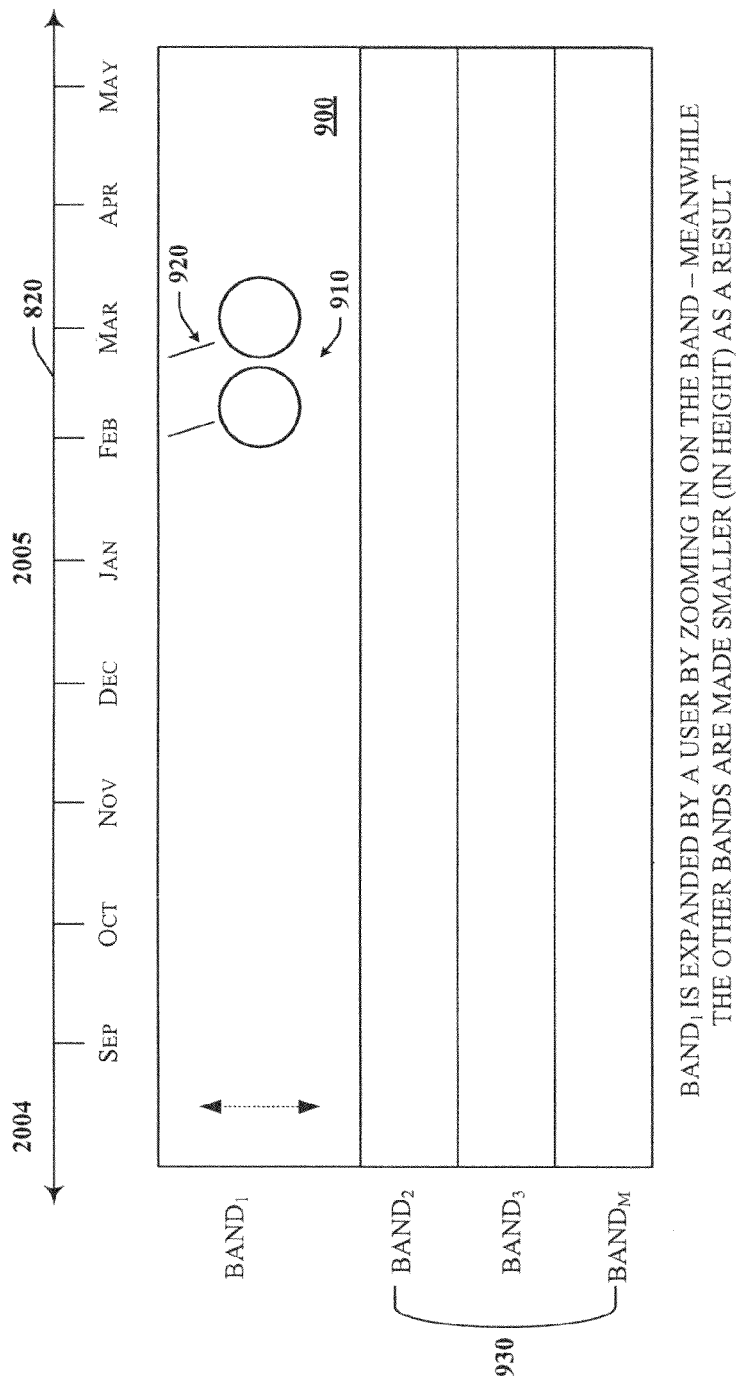
Figure 10:
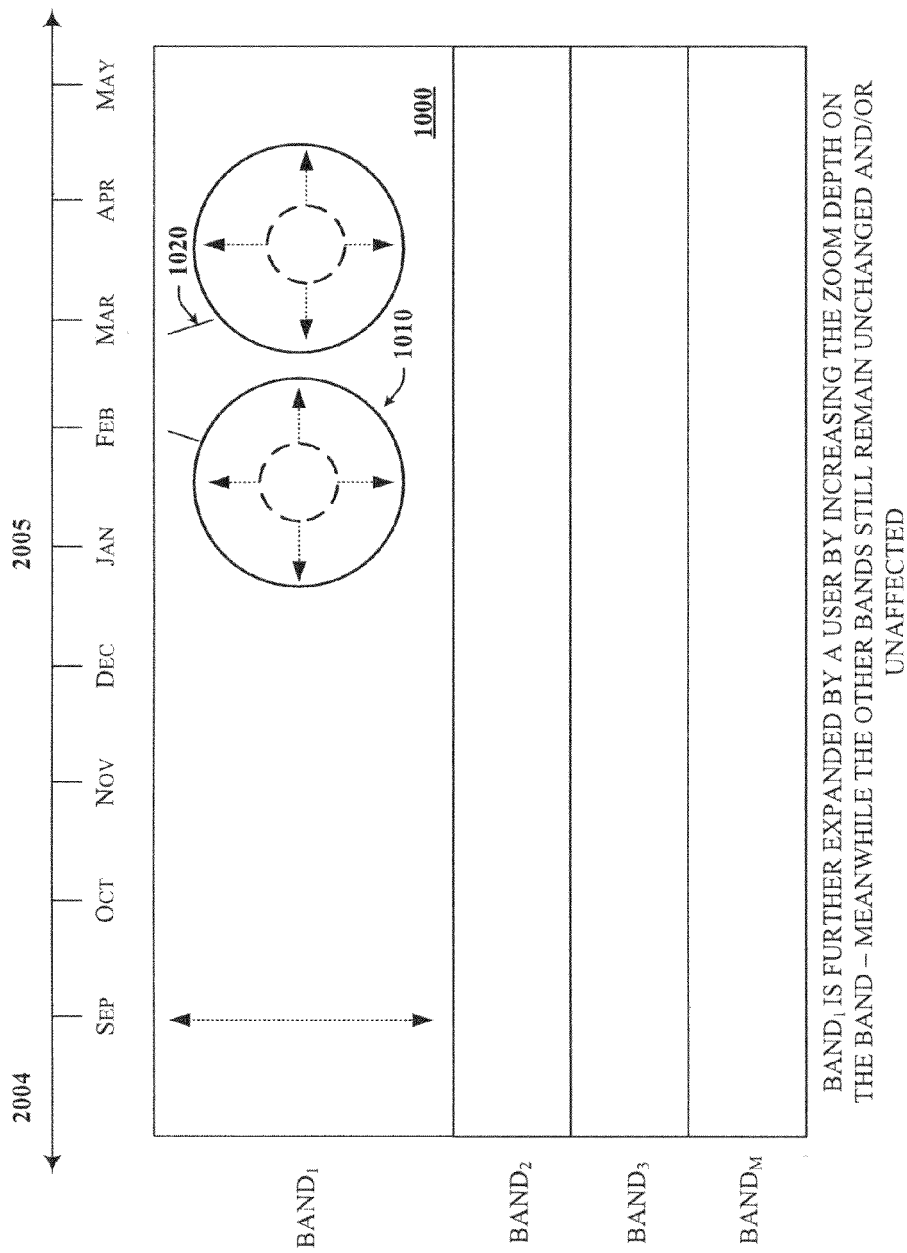

Moving on to FIGS. 8-10, an open or expansion operation is demonstrated with respect to at least one band. Beginning in FIG. 8, there is illustrated a diagram 800 of a plurality of definable bands 810 arranged in a stack (e.g., along a y-axis of a user-interface). Across the top of the stack of bands, a time axis 820 can be found. The time axis 820 facilitates navigation within each band as well as among multiple bands. In this scenario, the time axis is set to view the bands on a month basis. As depicted in FIG. 8, the bands 810 are compressed, thus individual objects contained in any of the bands may not be visible to the user.

In FIG. 9, a user zooms into or opens $BAND_1$ 900 and as a result, two objects 910 are now visible. Anchors 920 provide a reference to the date the objects fall on along the time axis 820. The other bands 930 on-screen are made smaller as a result of the expansion of $BAND_1$ 900.

In FIG. 10, the user has continued to expand $BAND_1$ 900; and $BAND_1$ 1000 results therefrom. As can be seen, the height of $BAND_1$ 1000 has increased substantially and consequently, the size or dimensions of the objects 1010 (e.g., 910 in FIG. 9) have increased as well. Hence, more detail with respect to the objects 1010 can be viewed by the user; however the increase in detail may depend on the number of other objects in the band within the current time period (e.g., September 2004-May 2005). In addition, more densely packed objects can unfold and appear on-screen. Due to the movement of the objects in response to the band expansion and due to the potential revealing of additional objects, the position of the anchors 1020 may change to compensate for the changes in space consumption.

Figure 11:
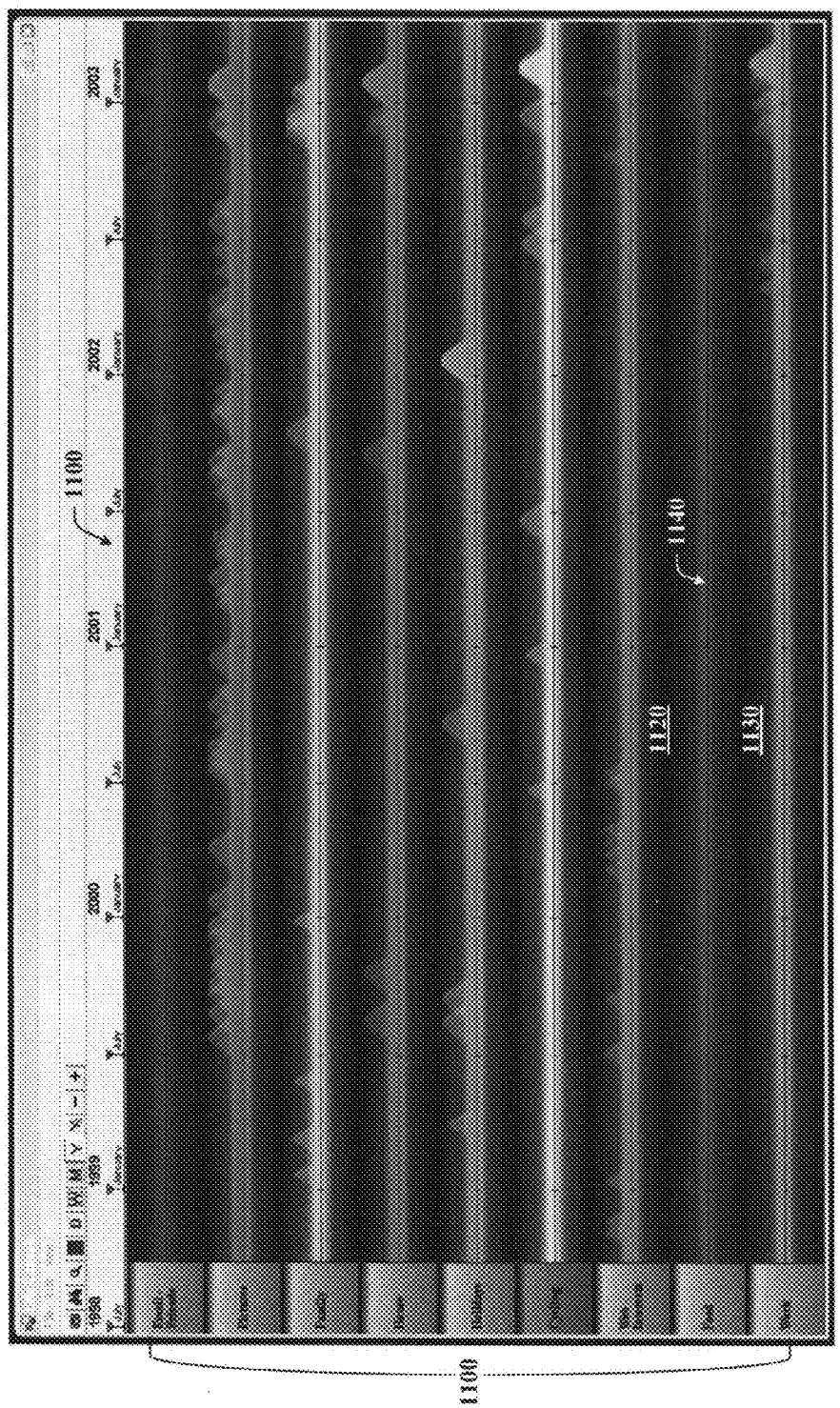
FIGS. 11-14 are screen images of an exemplary user-interface illustrating a sequence involved in the opening of at least one band in accordance with an aspect of the subject invention.

The events taking place in FIGS. 8-10 may be better visualized by the screen-capture images represented in FIGS. 11-14. The screen-capture images represent an exemplary user-interface making use of the systems and techniques discussed hereinabove. In FIG. 11, a plurality of bands 1100 are arranged in a stack. The bands are named and appear in various colors to easily distinguish the different bands from one another. Across the top of the stack lies a time-based navigation bar 1110.

The bands 1100 appear in a compressed state; however, the density and/or presence of objects within each band according to the time parameter (e.g., years: 1999-2003) is represented by the appropriate sinusoidal curves. For example, the more transparent a curve is can indicate that fewer objects are located there. Similarly, the more opaque curve can indicate a more densely populated area in the band at a particular time/date period.

Alternatively or in addition, the height of the curve can indicate how densely populated a section of the band is. For instance, a relatively shorter curve can indicate fewer objects and a relatively taller curve can indicate a greater number of objects. Finally, the upper 1120 and lower 1130 portions of each band can be seen as defined by a bar 1140 dividing each band along the x-axis. This bar 1140 can mirror the functionalities of the time-based navigation bar 1110 such as by serving as a time reference or by mirroring the time state of the navigation bar 1110. The bar can also be used to expand or compress the band. That is, when the bar is grabbed in an upward motion, the upper and lower portions of the band expand. The converse occurs when the bar is grabbed with a downward motion.

Figure 12:
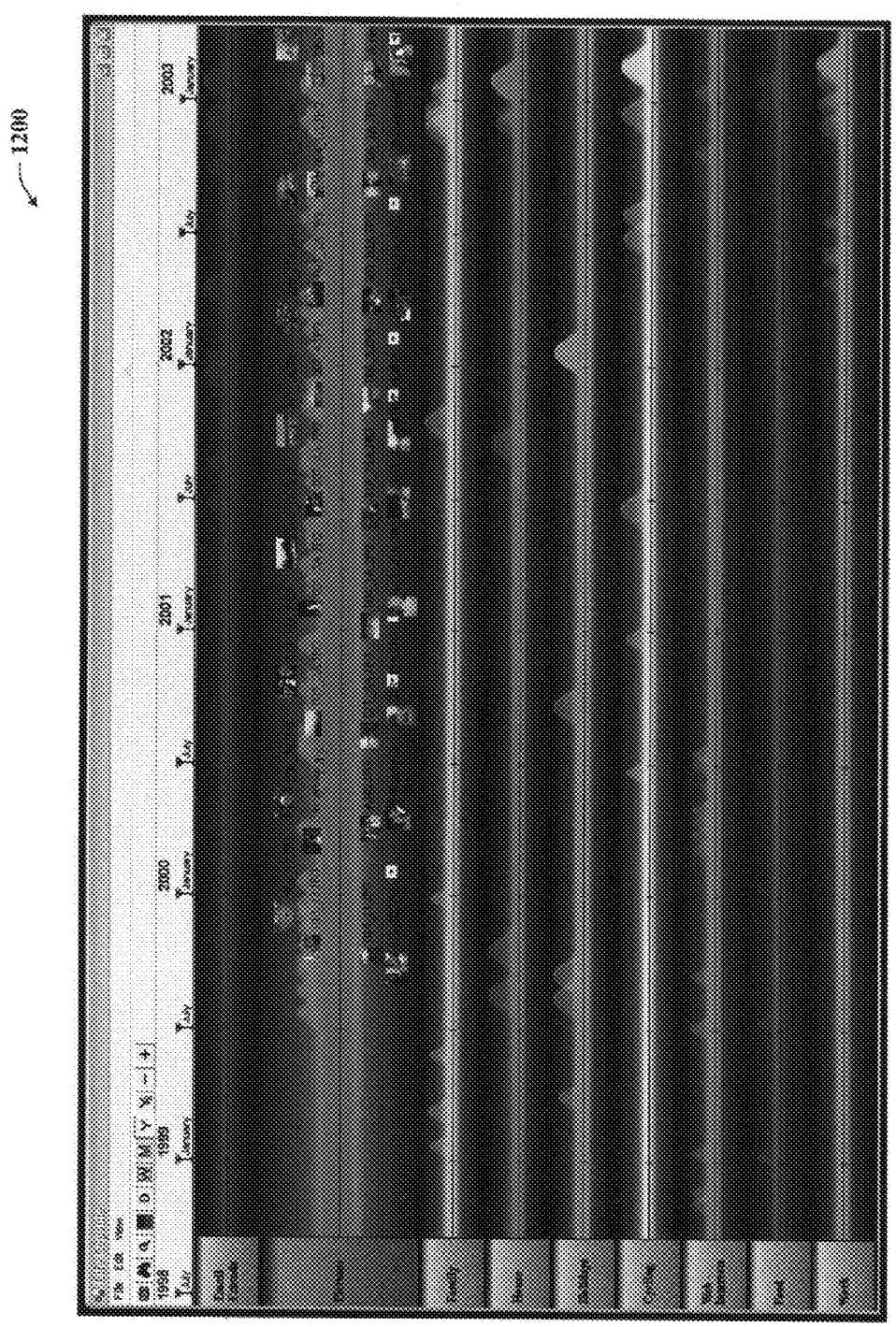

From FIG. 11, FIGS. 12-14 demonstrate the "opening" sequence of a band called "Pictures". In FIG. 12, a plurality of objects relatively small in size is now visible in both the upper and lower portions of the band. The sinusoidal curves in the band are gradually diminishing from view.

Figure 13:
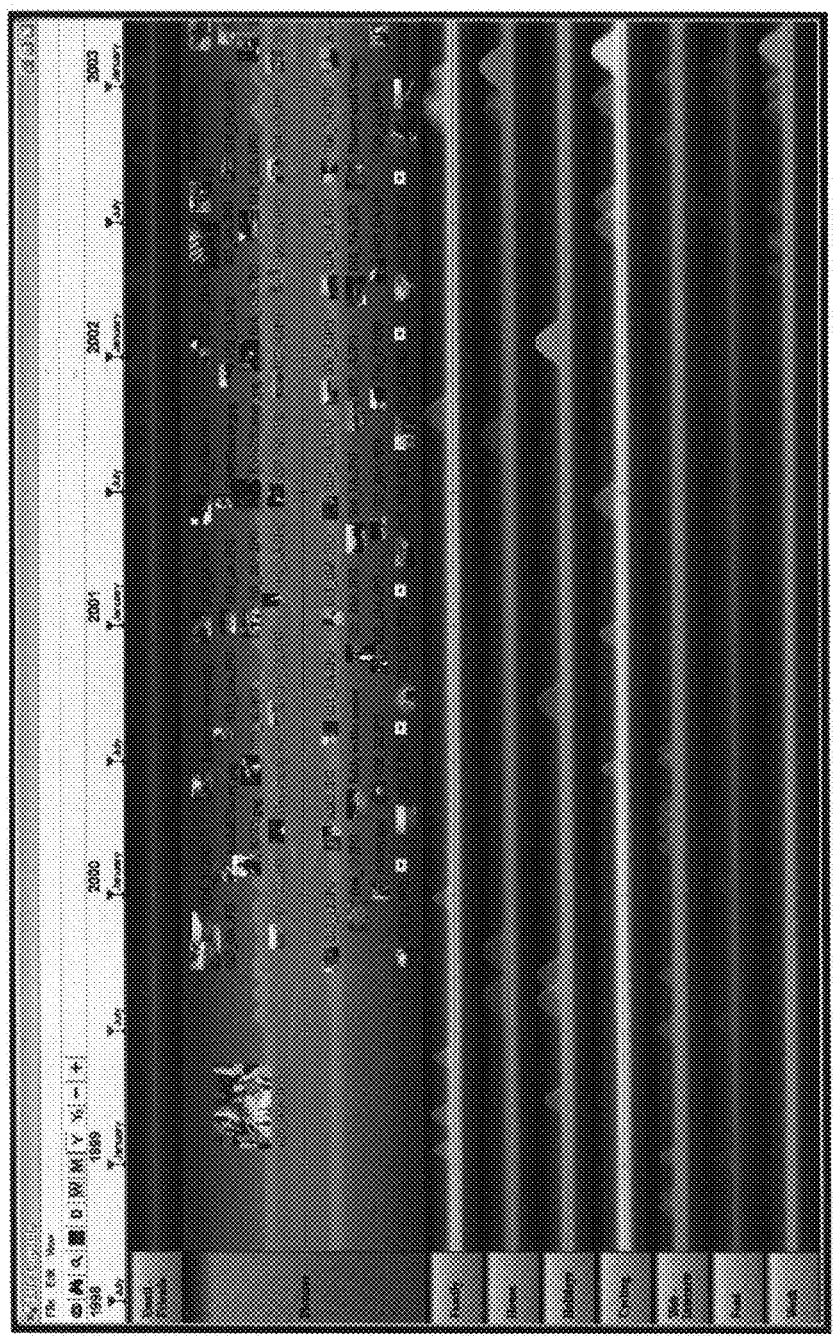

In FIG. 13, as the band continues to "open" or expand, even more objects can be seen. The names or titles given to each object can be seen but can be turned off to increase available screen space within the band and optimize object visibility. The sinusoidal curves continue to diminish from view.

Figure 14:

In FIG. 14, the Pictures band is fully opened. To view objects before January 1999 or after January 2003, the user can grab the band such as by using a pointing device (e.g., mouse) and move it to the right or left to navigate to other years or months. In this expanded view of the band, the band bar 1400 mirrors the months indicated on the time-based navigation bar 1410. In addition, the band bar 1400 includes markers at the relative dates to indicate where the visible objects actually "exist" in time (along the time-line (1410)). The other bands on-screen have been further compressed to make room for the expansion of the Pictures band.

Figure 15:
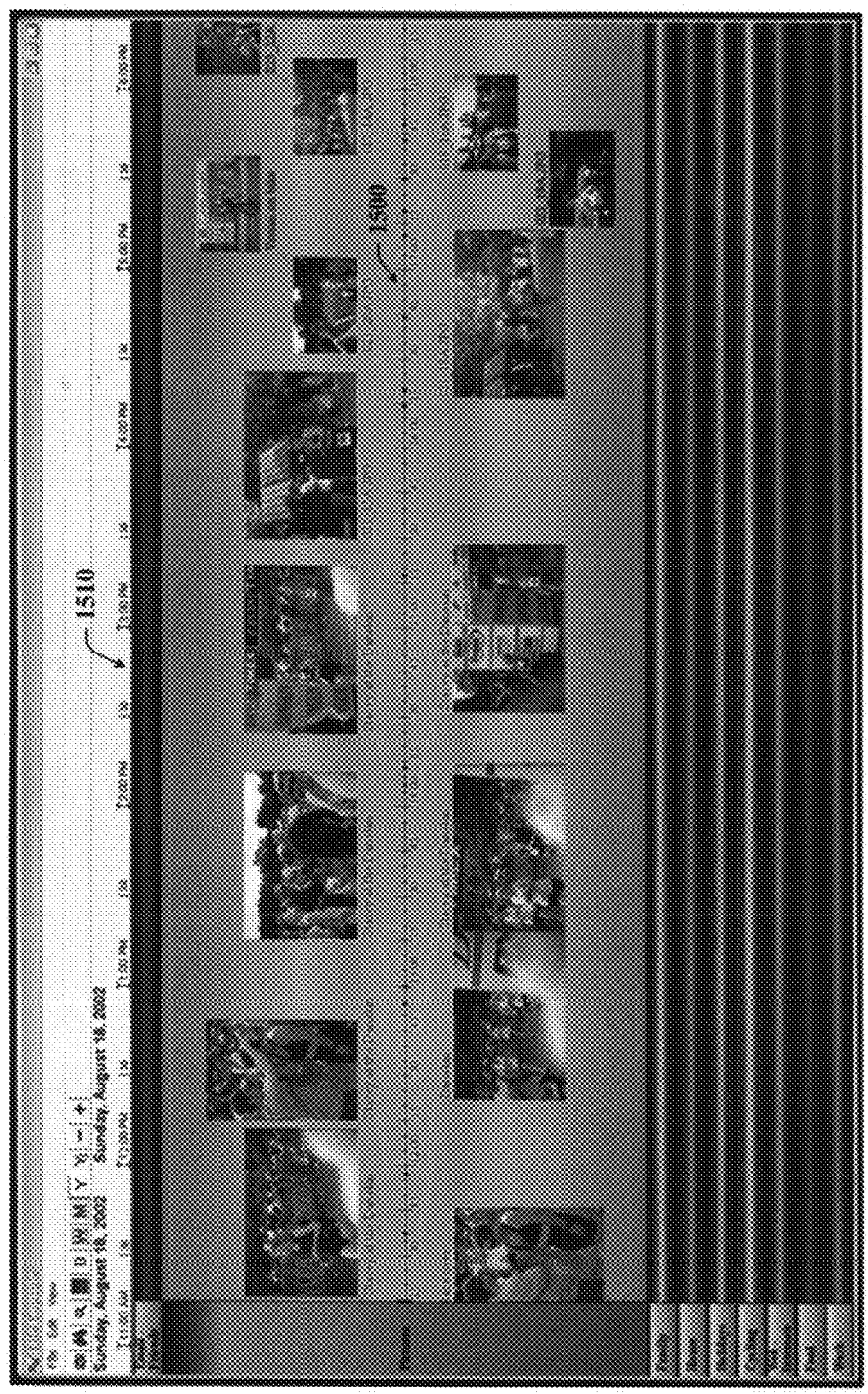
FIG. 15 is a screen image of an exemplary user-interface illustrating the zooming in of a band in accordance with an aspect of the subject invention.

FIG. 15 demonstrates a zoom-in of the Pictures band. The zoom-in can be accomplished by motioning a mouse wheel up when using a wheel-enabled mouse. Zooming in on the band to view a particular object or set of objects at a specific date/time can also be accomplished in part by selecting and/or clicking on the bar 1500 within the band. In this exemplary screen image, the bar 1500 reflects more time detail than the time-based navigation bar 1510.

Figure 16:
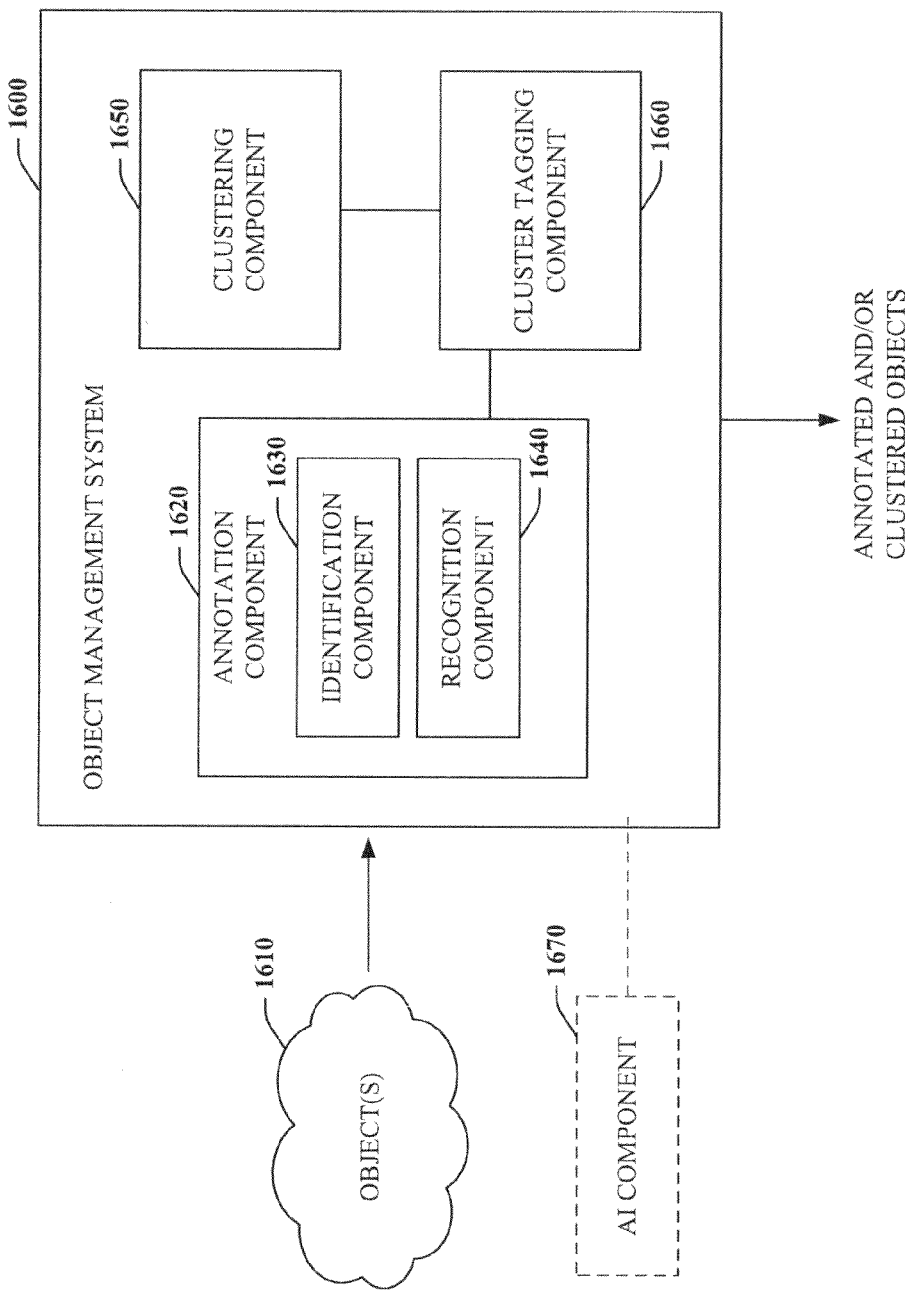
FIG. 16 is a block diagram of an object management system that can be used in connection with the object navigation and management systems of FIGS. 1, 2, and 5 in accordance with an aspect of the subject invention.

Turning now to FIG. 16, there is illustrated a block diagram of an object management system 1600 in accordance with an aspect of the subject invention. The system 1600 that can be used in conjunction with systems 100 or 500 as discussed, supra, in FIGS. 1 and 5, respectively. More specifically, the object management system 1600 can facilitate the organization and visibility of objects within their respective bands. In general, the object management system 1600 can receive one or more objects 1610 and by way of various components, can yield annotated and/or clustered objects. As a result, the objects can be readily browsed and/or located.

The object management system 1600 includes an annotation component 1620 having an identification component 1630 and a recognition component 1640 therein. The annotation component 1620 can annotate the objects according to their names or properties as identified by the identification component 1630. In addition, the annotation component 1620 can annotate objects according to any recognized characteristics by employing the recognition component 1640. For example, imagine that an object undergoing annotation is a photo of the user's sister, Mary. Without requiring explicit user input, the recognition component 1640 can employ a facial or pattern recognition sub-component (not shown) to accurately identify the person in the picture as Mary and annotate the picture object accordingly. The recognition component 1640 can also make use of optical character recognition and sound recognition.

Closely related objects can be clustered together by a clustering component 1650. The clustering component 1650 can also be used to identify one of the objects as being the most representative of the cluster. Thus, when screen or band space is limited or restricted, the representative object can be used to identify the cluster to the user. Alternatively, the metadata associated with the objects of a cluster can be analyzed and the most relevant or representative metadata to describe the cluster can be used to identify the cluster. For example, clusters of objects can be given a label by a cluster tagging component 1660. The cluster label can remain visible and legible even when the bands are compressed. To view or zoom in to the cluster to see the objects therein, the user can click the label at least once.

An artificial intelligence component 1670 can be employed in connection with the object management system 1600 to automatically and perhaps more efficiently annotate objects and/or cluster closely related objects. Proficient annotation and clustering of objects can assist in the browsing and locating of objects within and across multiple bands.

Figure 17:
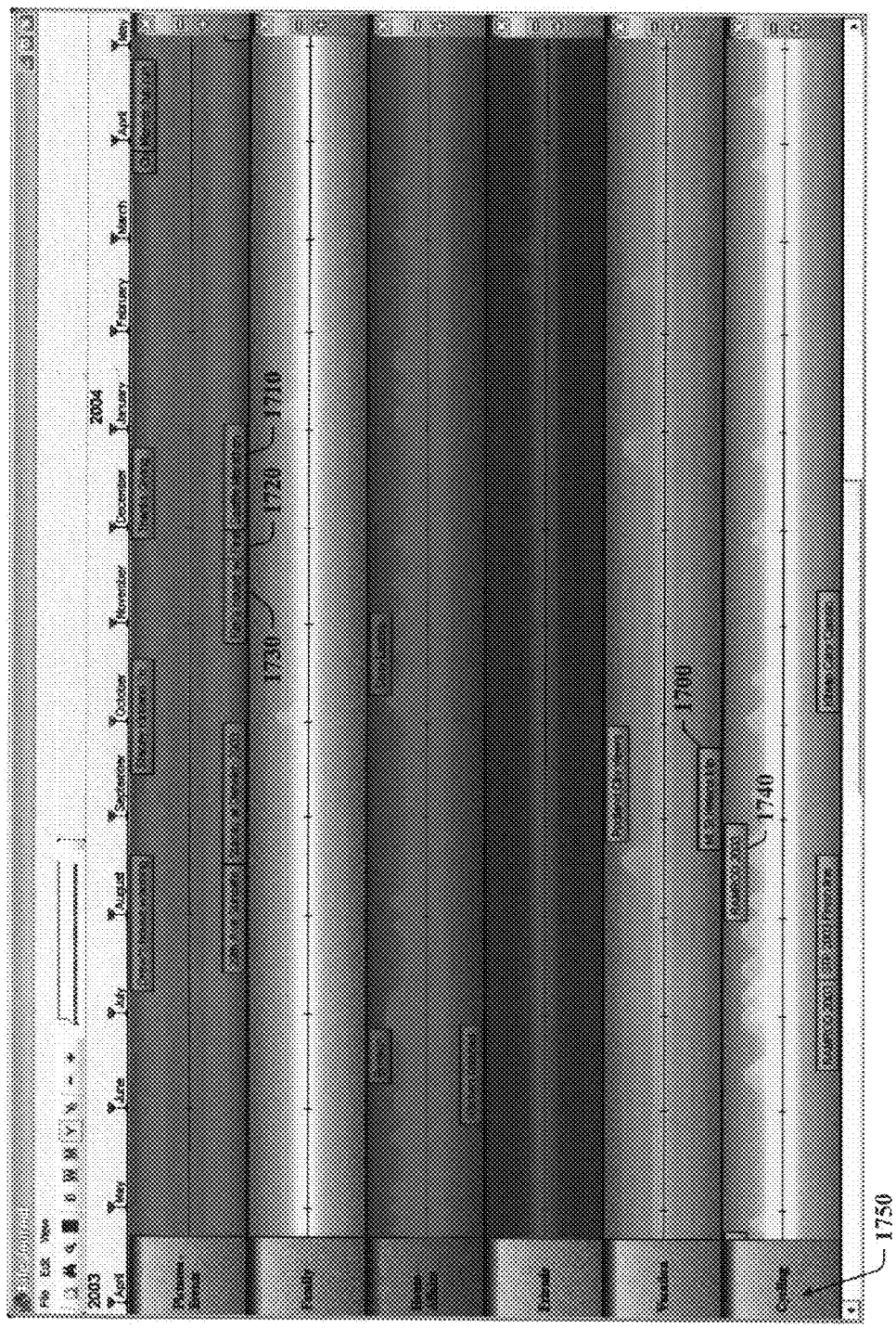
FIG. 17 is a screen image of an exemplary user-interface showing a plurality of cluster labels on bands that are relatively compressed in accordance with an aspect of the subject invention.

FIGS. 17-20 that follow further illustrate the operations of the system 1600. In FIG. 17, a plurality of cluster labels 1700 can be seen in the bands according to their occurrence in time. Similar to individual objects, clusters of objects can be assigned priorities or different levels of importance by the user. Thus, the label of a more important cluster can overlap and appear to partially obscure the view of other less important clusters that are located at a relatively close distance. By way of example, cluster label 1710 is presumably of a higher importance to the user than cluster label 1720 which is more important than cluster label 1730. Allowing the necessary overlap between cluster labels as well as objects within a band facilitates providing more information to the user rather than allowing less important objects or clusters to disappear completely from view.

Figure 18:
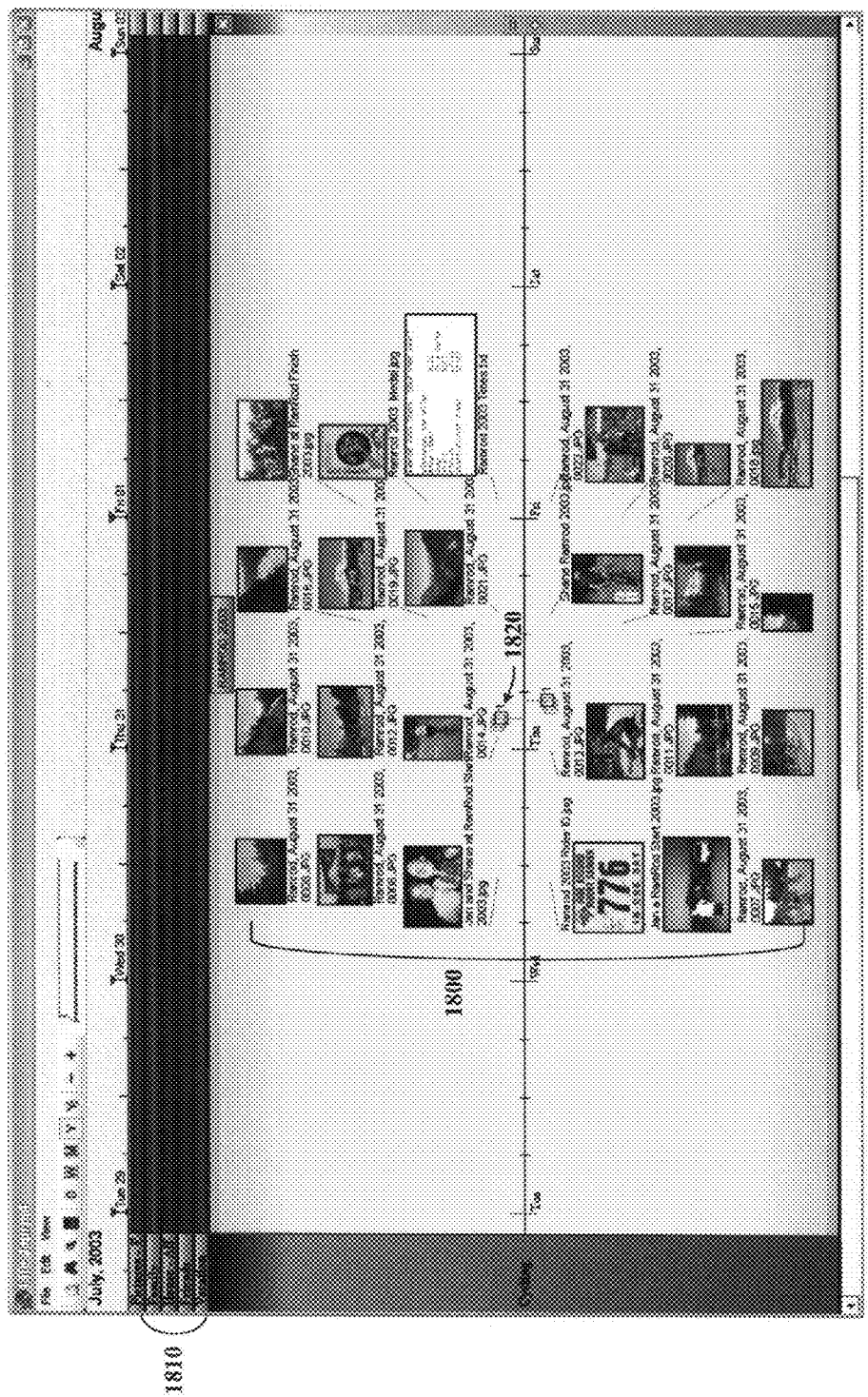
FIGS. 18-19 are screen images of an exemplary user-interface demonstrating clicking on a cluster label and then zooming out from that view in accordance with an aspect of the subject invention.

Now suppose the user would like to view the objects in cluster 1740 (labeled RAMROD 2003). To accomplish this, the user can click on the label 1740. This causes the respective Cycling band 1750 to open to make the objects in the cluster 1740 visible. The screen image of FIG. 18 illustrates the final result: the objects 1800 in the cluster 1740 are visible (along with the important metadata: e.g., title, date) and the other bands 1810 on-screen have been substantially compressed due to the change in screen space allotment between the bands.

Some objects within a particular cluster can be compressed by the user. Hence, when the cluster is opened, these few objects can remain closed but their existence is not forgotten as indicated by an icon 1820. The icon 1820 indicates that s objects (e.g., s=1) in this region could not be displayed because of space constraints given the current zoom level—due to the importance level assigned thereto, for example.

Figure 19:
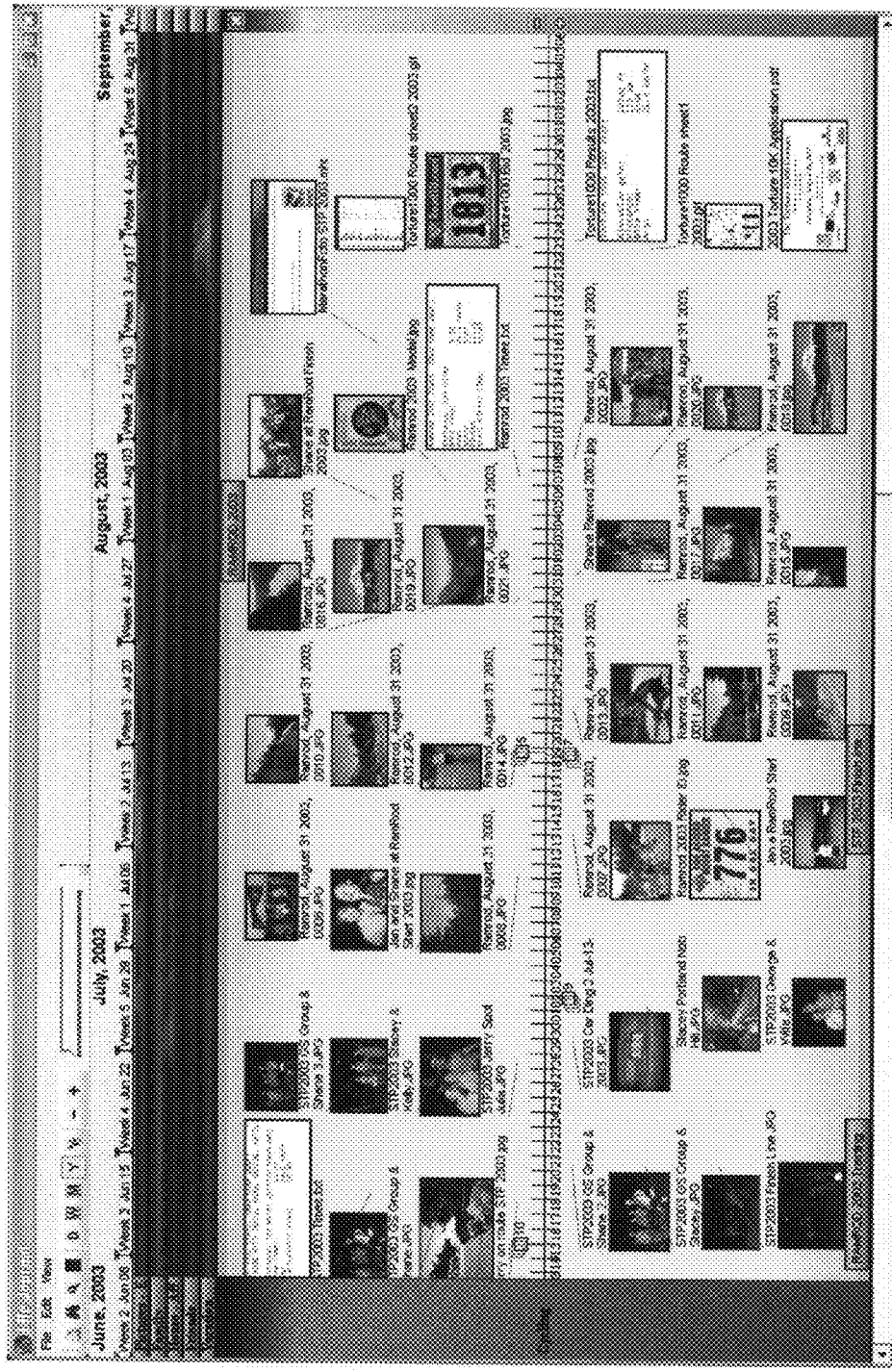

When the user zooms out from the cluster 1740, additional objects located around the cluster 1740 can be viewed as shown in FIG. 19. It should also be noted that navigation buttons on the right side of the band can facilitate quickly compressing ("x") the band to its minimum height or decreasing the amount of expansion ("−") or compression ("+") gradually.

Figure 20:
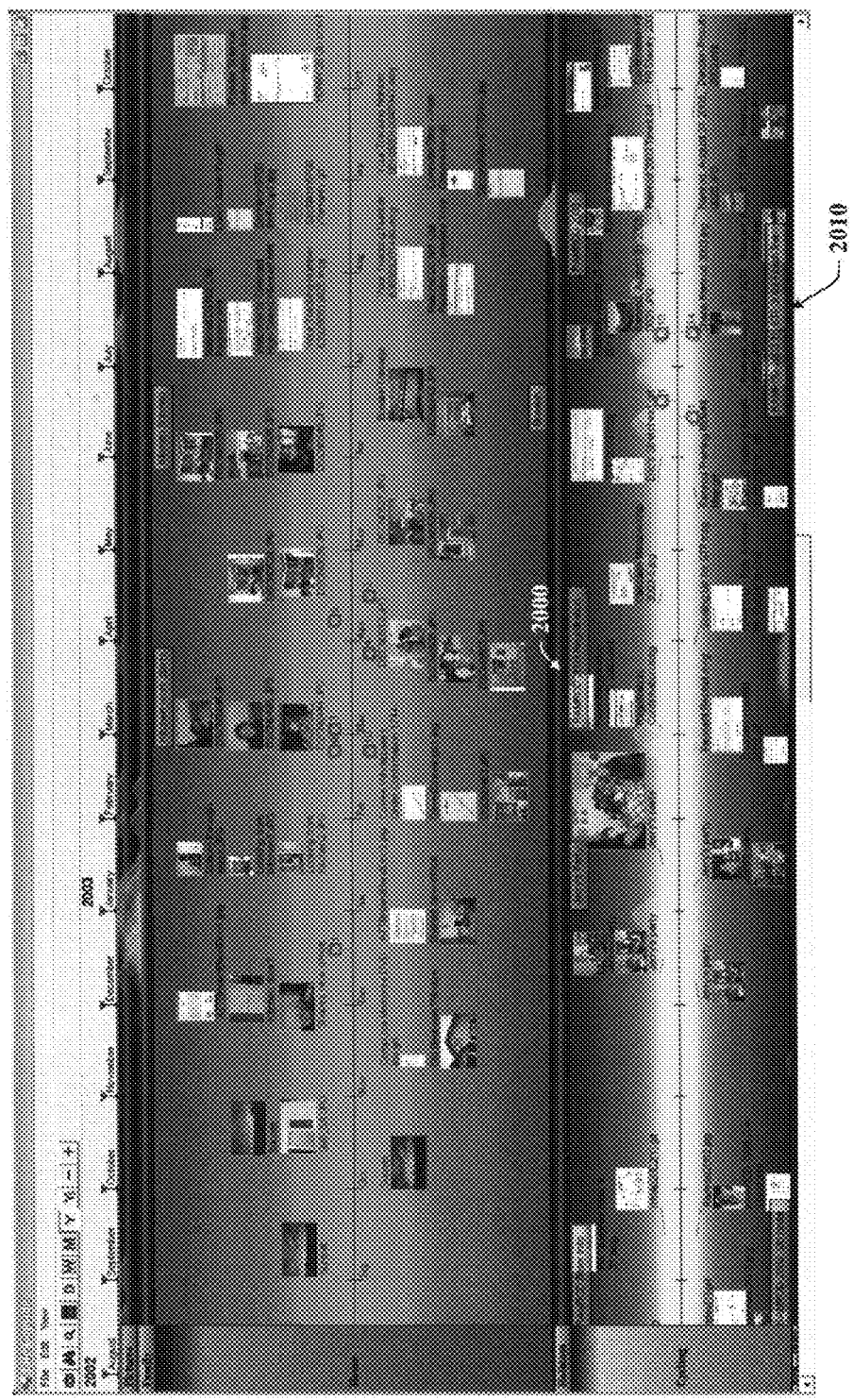
FIG. 20 is a screen image of an exemplary user-interface illustrating the transparency and overlap of objects and/or cluster labels in accordance with an aspect of the subject invention.

Finally, in FIG. 20, the notions of overlap and transparency of objects or cluster labels is illustrated once again. As can be seen (e.g., at 2000 and 2010) in the screen image, cluster labels and/or objects can be set to overlap one another but in doing so, adopt a level of transparency so that information pertaining to the objects behind is not completely lost or hidden from the user. Thus, when managing hundreds or thousands of objects within a band, perspective, insight, and/or relevancy are not totally compromised by objects deemed to be more important. That is, the user can retain a more complete picture of his/her objects and their relationships and associations to each other.

Figure 21:
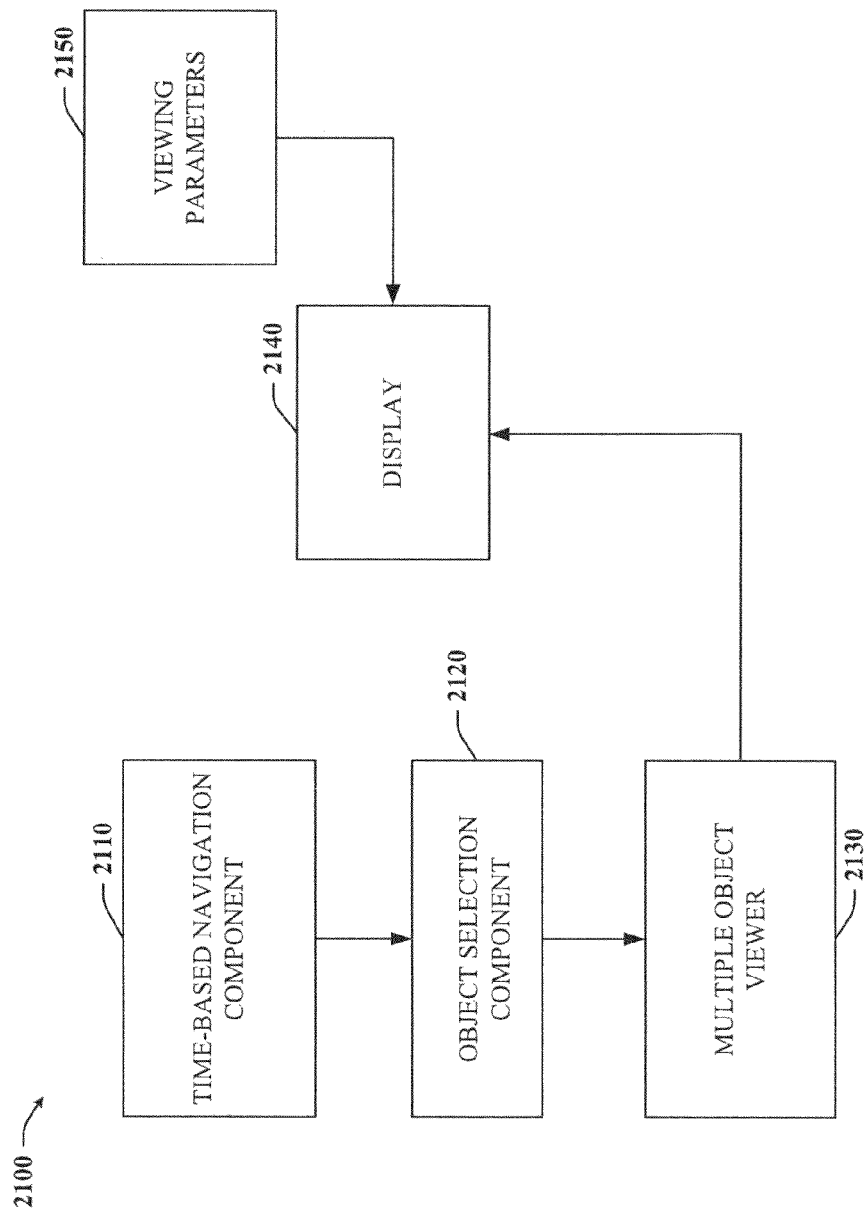
FIG. 21 is a block diagram of an object navigation and management system that facilitates object selection and viewing of selected objects in accordance with an aspect of the subject invention.

Referring now to FIG. 21, there is illustrated a block diagram of a navigation and selection system 2100 that can be employed in connection with the systems 100, 200, and/or 500, discussed, supra, (FIGS. 1, 2, and 5). The system 2100 can be utilized to facilitate navigating and viewing objects of interest located in one or more bands. The system 2100 includes a time-based navigation component 2110 that allows a user to navigate through a plurality of objects in one or more bands. The objects are associated with a time parameter, thus as the user selects a desired time parameter, different objects corresponding thereto can be viewed or displayed. In particular, one or more objects can be selected for more in-depth viewing using an object selection component 2120. The selection of objects to view can be based on a desired time parameter (e.g., particular week or day) or can be determined by the objects currently visible.

When multiple objects are selected for more detailed viewing or for use in another application or operation, a multiple object viewer 2130 can arrange the selected objects in a desired manner (e.g., chronologically by date) for viewing on a display 2140. One or more viewing parameters 2150 can be set or adjusted to customize the appearance of the objects on the display. For example, color tones and viewing size of the objects can be modified, titles can be turned on or off, speed at which to view the objects can be adjusted, the number of objects to view at a time can be changed, etc.

Figure 22:
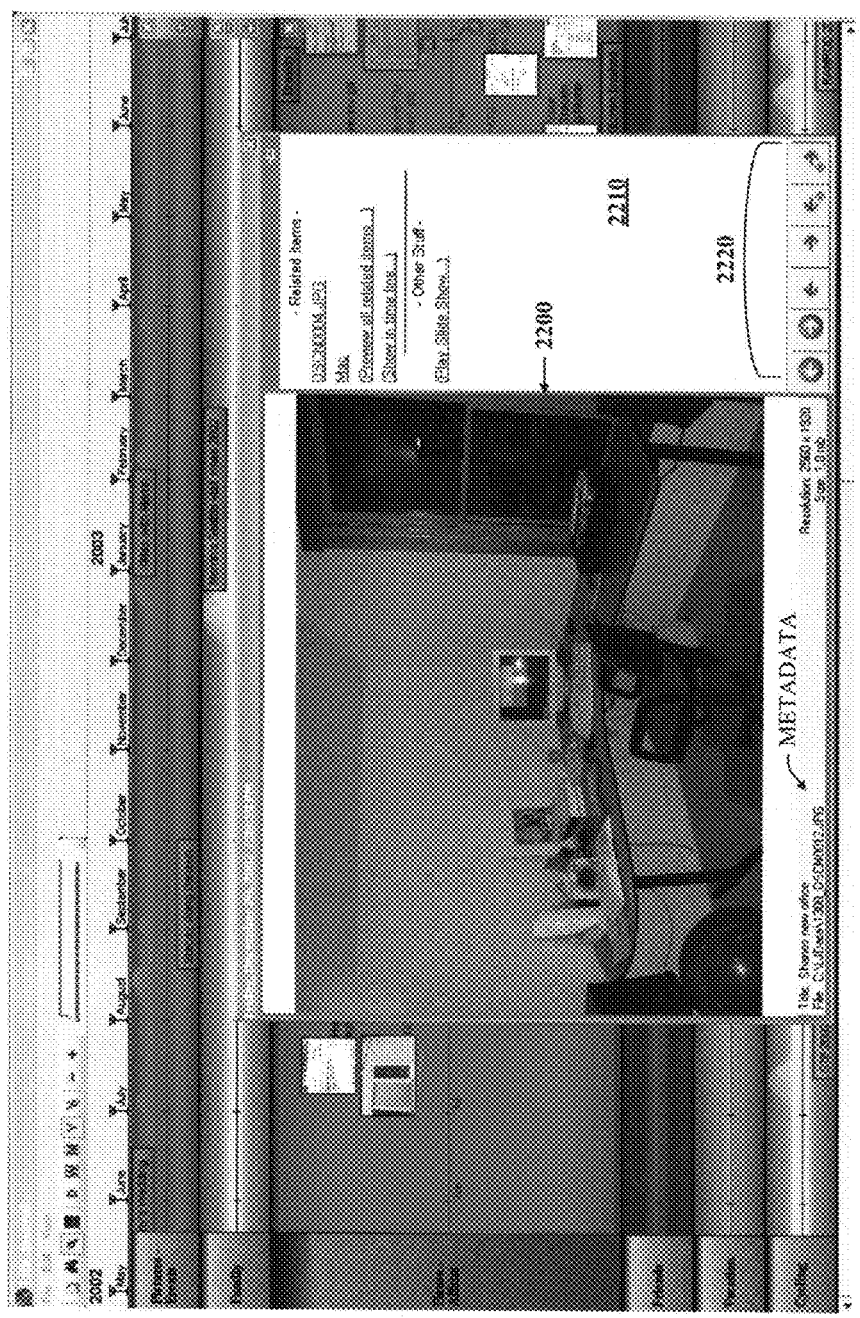
FIGS. 22-27 are screen images of exemplary user-interfaces which demonstrate various object selection techniques in accordance with an aspect of the subject invention.

As mentioned above, the selection of objects for more in-depth viewing can be accomplished in part by a number of different selection techniques. For example, FIG. 22 demonstrates the selection of one object which can be performed by clicking on the object. The enlarged object 2200 can be shown with or without the extended window 2210 which displays "related items" as well as "other stuff" and navigational arrows. The object 2200 itself can display select metadata such as its title, storage location of the object (e.g., path name), size, and/or resolution.

Figure 23:
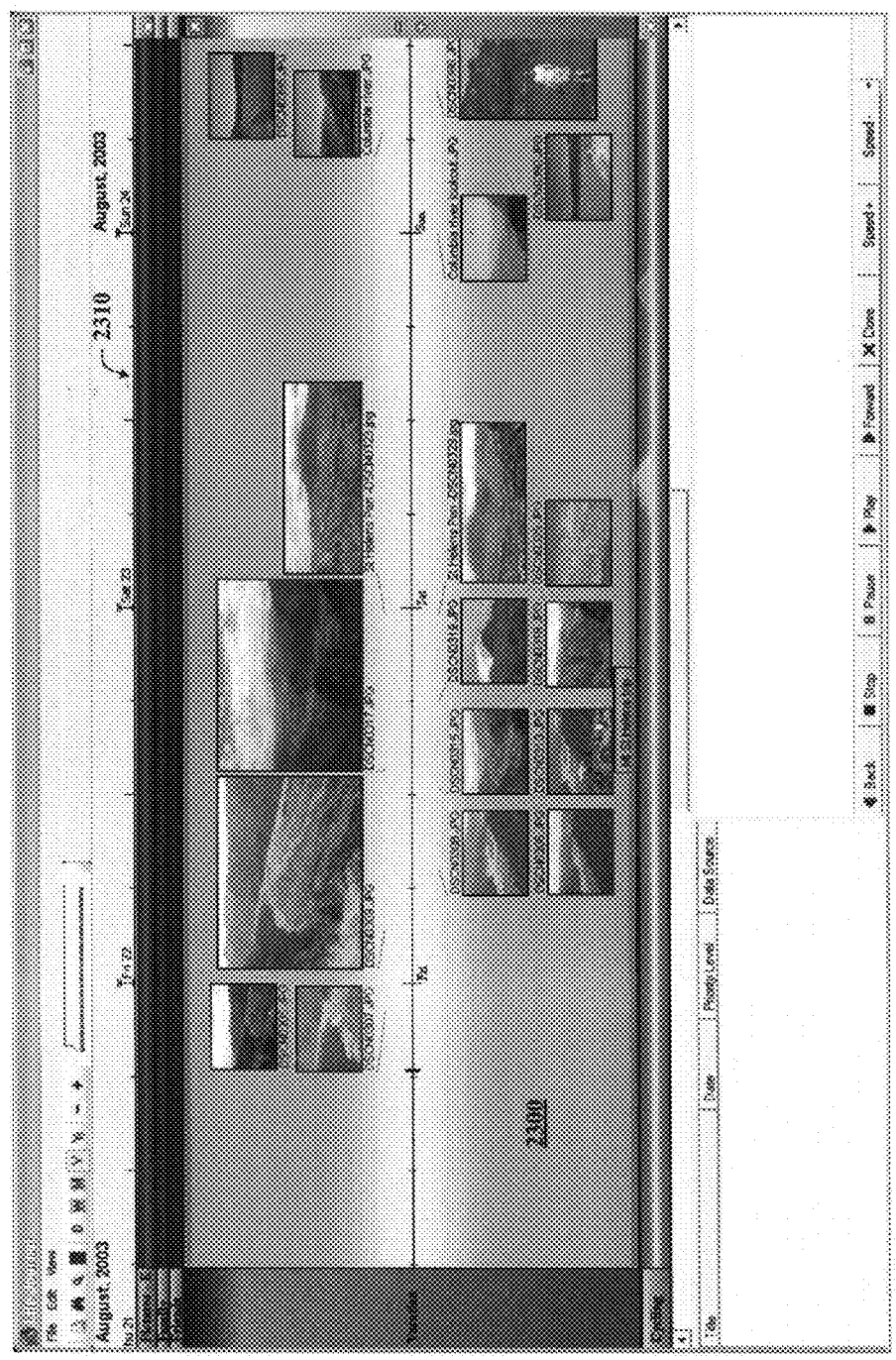

Alternatively, the selection of objects can take place by selecting a time frame along either the time-based navigation bar within the band or above the stack of bands. FIG. 23 illustrates a number of objects in a band 2300, wherein the band 2300 has been expanded and the band has been zoomed in along the time axis 2310 (e.g., time-based navigation bar). An object viewer 2320 has also been opened by the user but remains empty at the moment.

Figure 24:
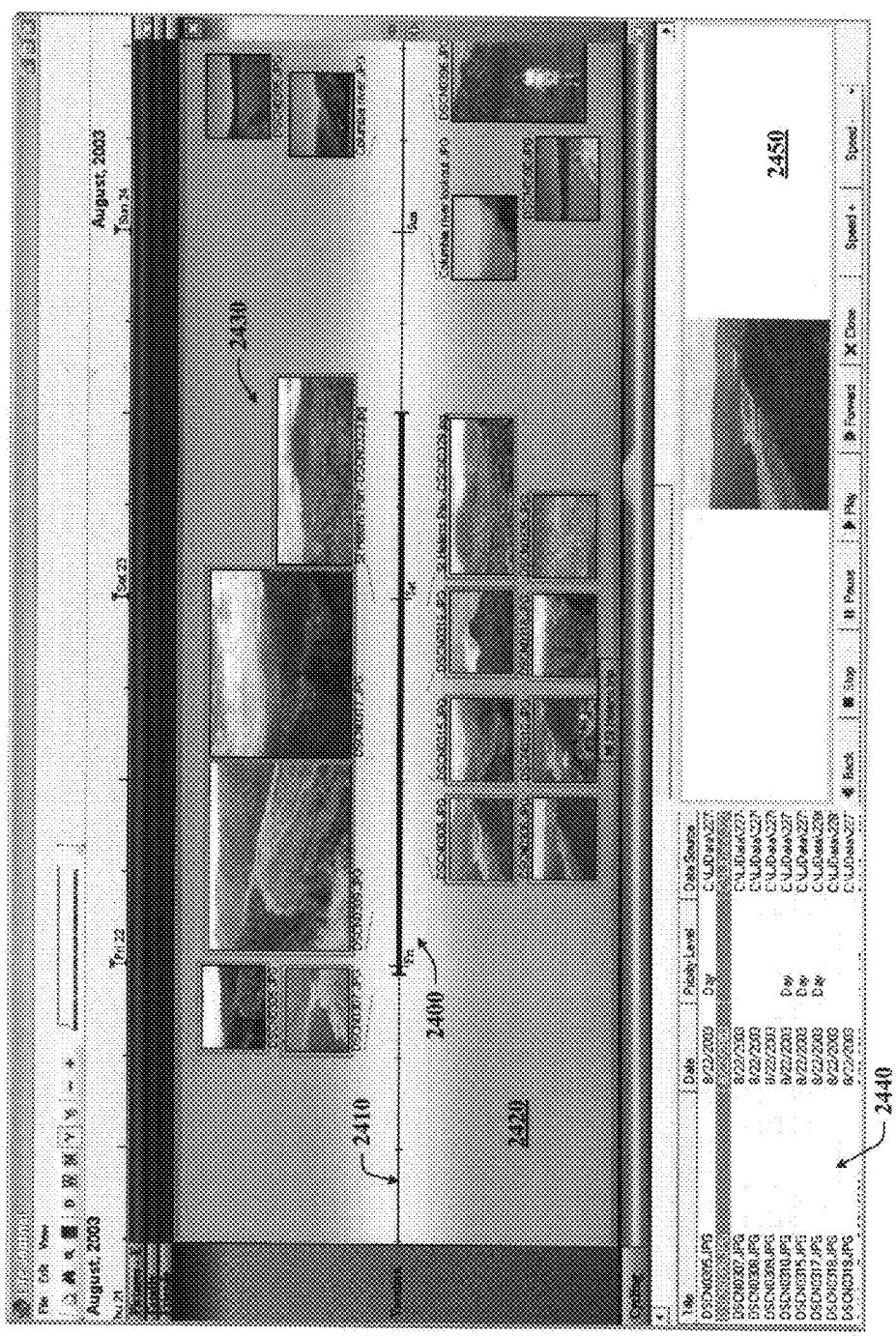

Following in FIG. 24, the user has selected a time period 2400 on the time bar 2410 within the band 2420. Upon this selection, the objects falling within this time period 2400 are highlighted 2430 and appear in an object list 2440 portion of the object viewer. The object viewer display window 2450 displays only the selected objects as ordered in the object list 2440. However, the order can change depending on which field is prioritized. For example, the object list can be ordered by title or by date or by importance level. Other ordering options may also be available. The selected objects can be "played" in the viewing window 2450 at an adjustable speed.

Figure 25:
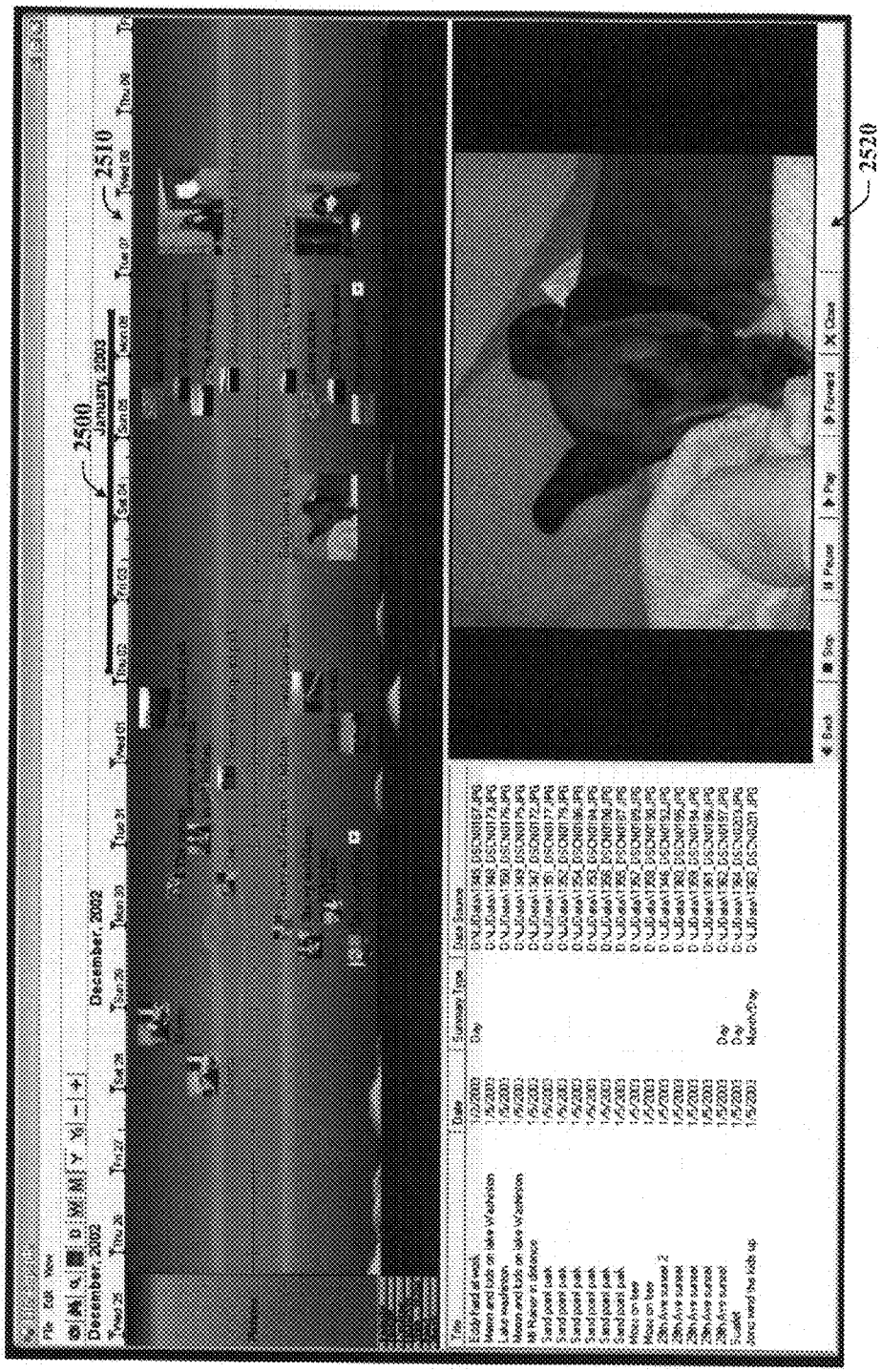

FIG. 25 demonstrates that the selection of objects can also be made by selecting a time period 2500 along the time-based navigation bar 2510 for separate viewing in an object viewer display window 2520.

Figure 26:
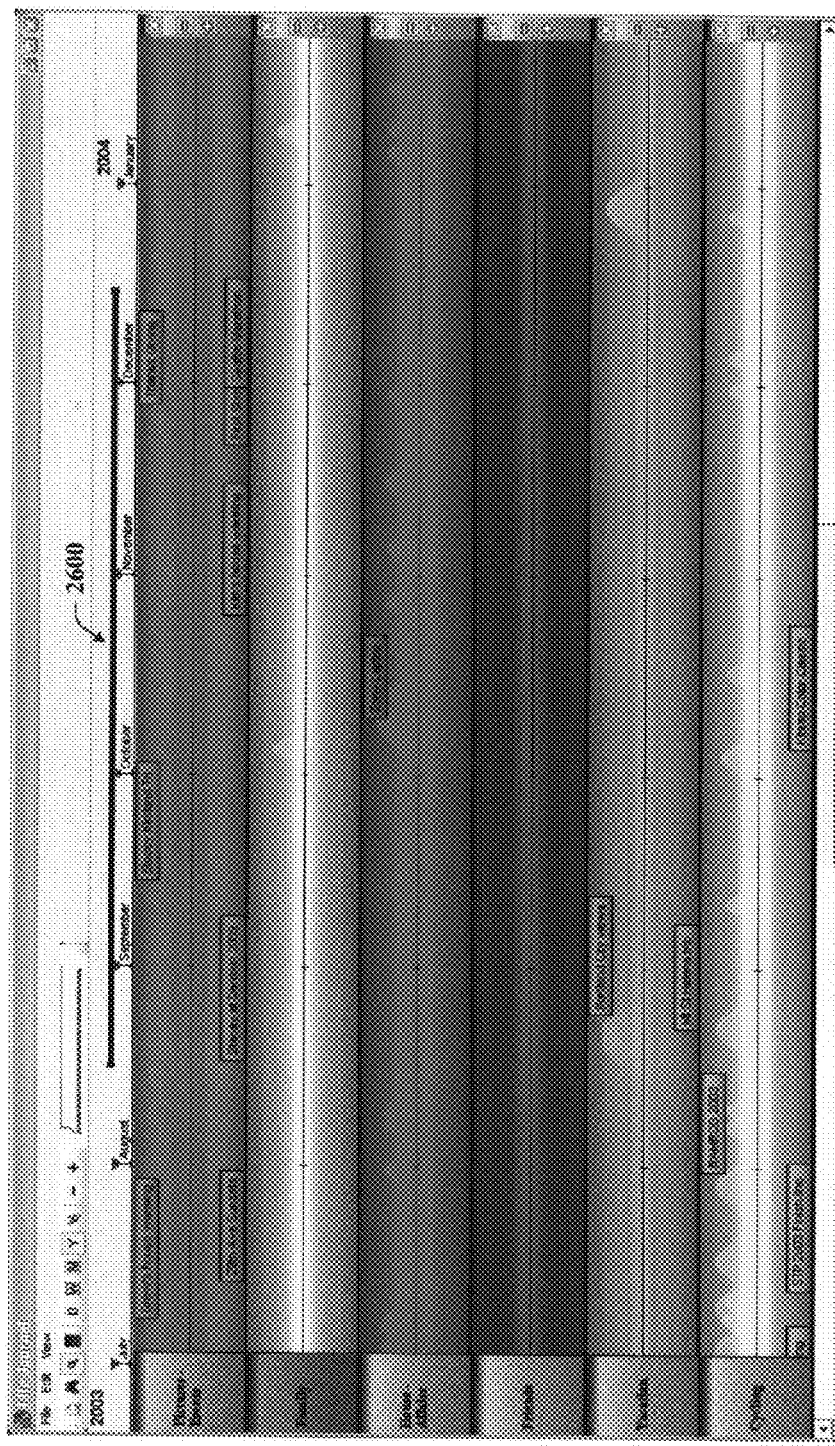
Figure 27:
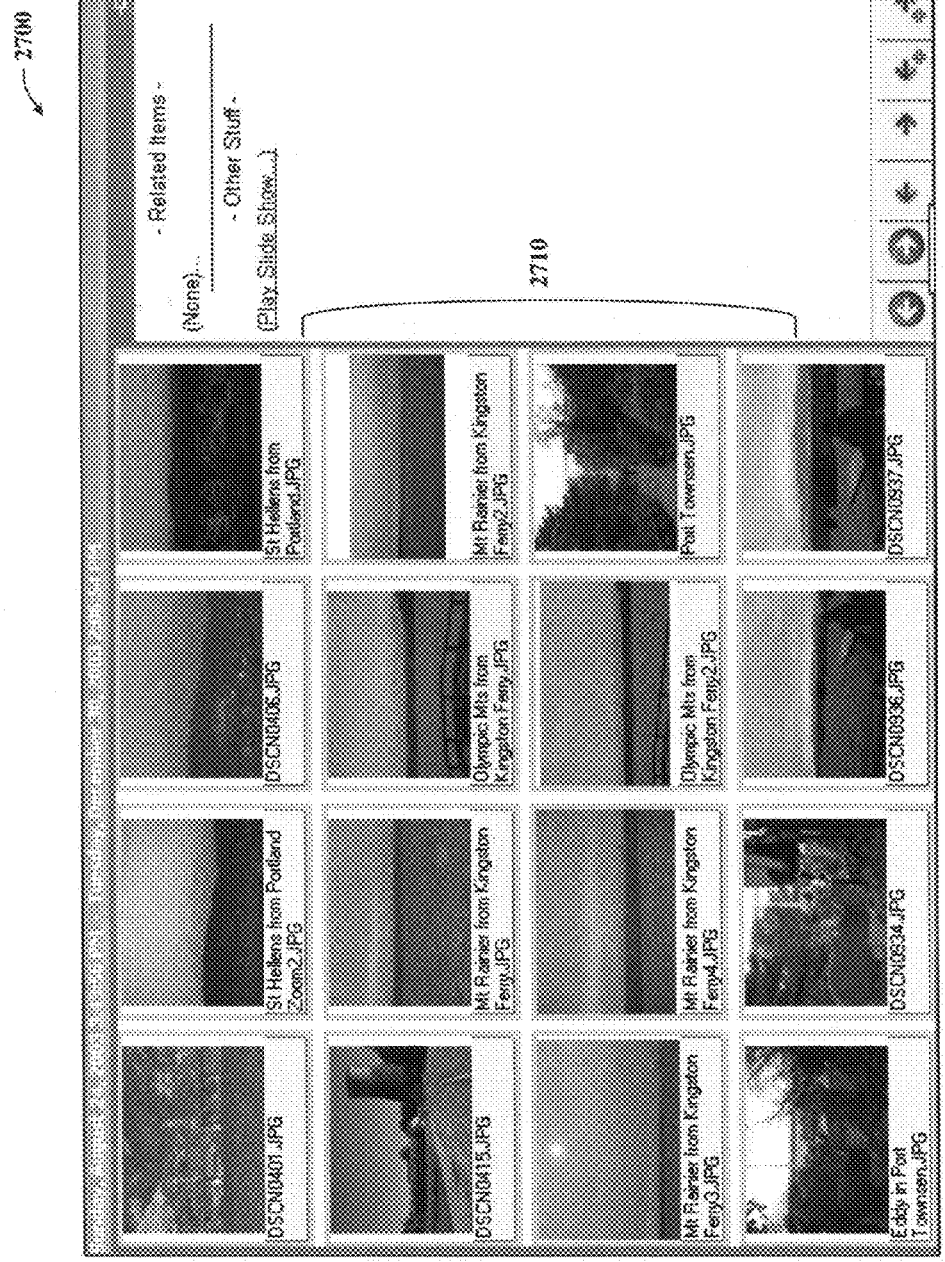

FIGS. 26 and 27 represent a slight variation to the viewing of selected objects in FIG. 25. In FIG. 26, selection of a range in a time line header 2600 is made. By default, the time line header 2600 can be a time range zooming tool. In practice, for instance, the user selects a time range by dragging the mouse on the time line and when the mouse button is released the view changes to the time range measured by the start and finish times of the line. If a CTRL (or other assigned) key is held down during this operation then all objects within the selected time range in all currently visible bands are selected. This action could then result in objects being displayed in another window as shown in 2700. This behavior allows access to all objects within a given time range to be displayed regardless of which specific band they are referenced in.

In FIG. 27, the layout of the objects 2710 can be changed as desired to modify the number of objects viewed at once. Because space in the window 2700 is limited and all of the objects 2710 are displayed at once, only the most relevant data may be shown for each object. The user or the system can determine what qualifies as the most relevant data and rank the various kinds of metadata in terms of importance when viewing space is limited.

Figure 28:
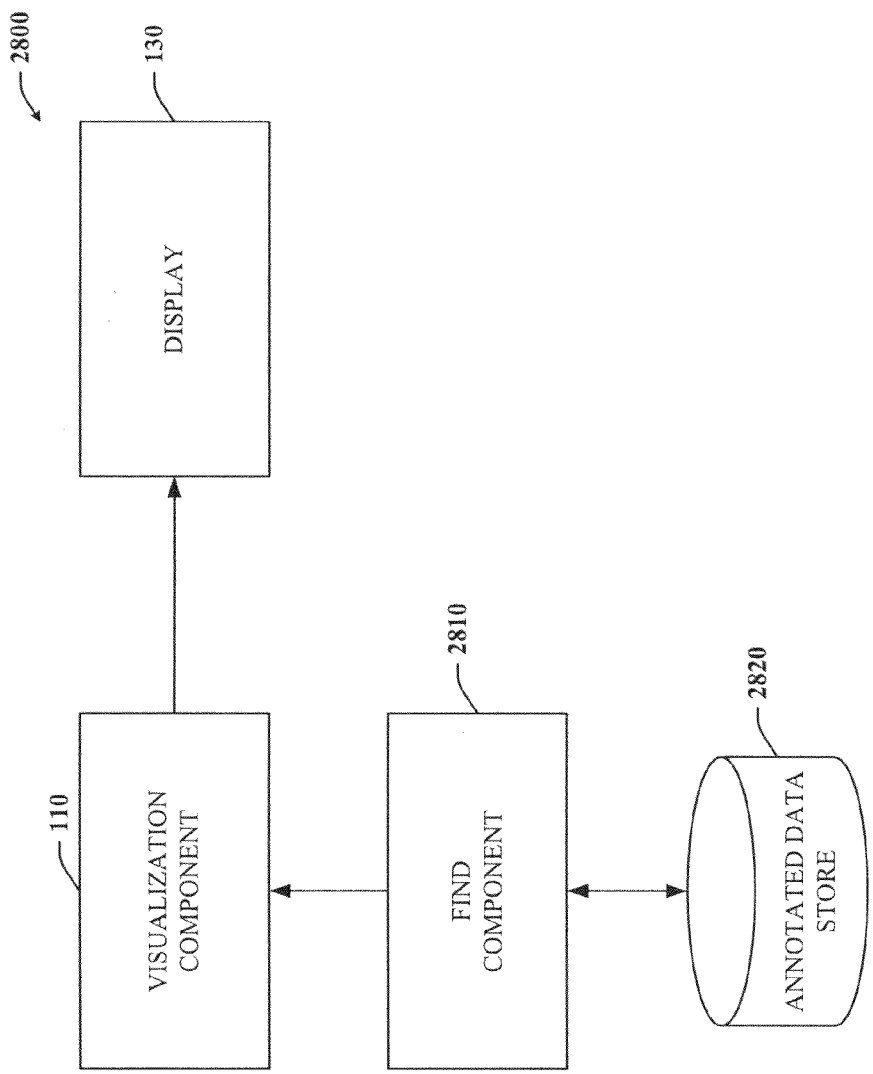
FIG. 28 is a block diagram of an object navigation and management system that facilitates finding objects and viewing found objects in accordance with an aspect of the subject invention.
Figure 29:
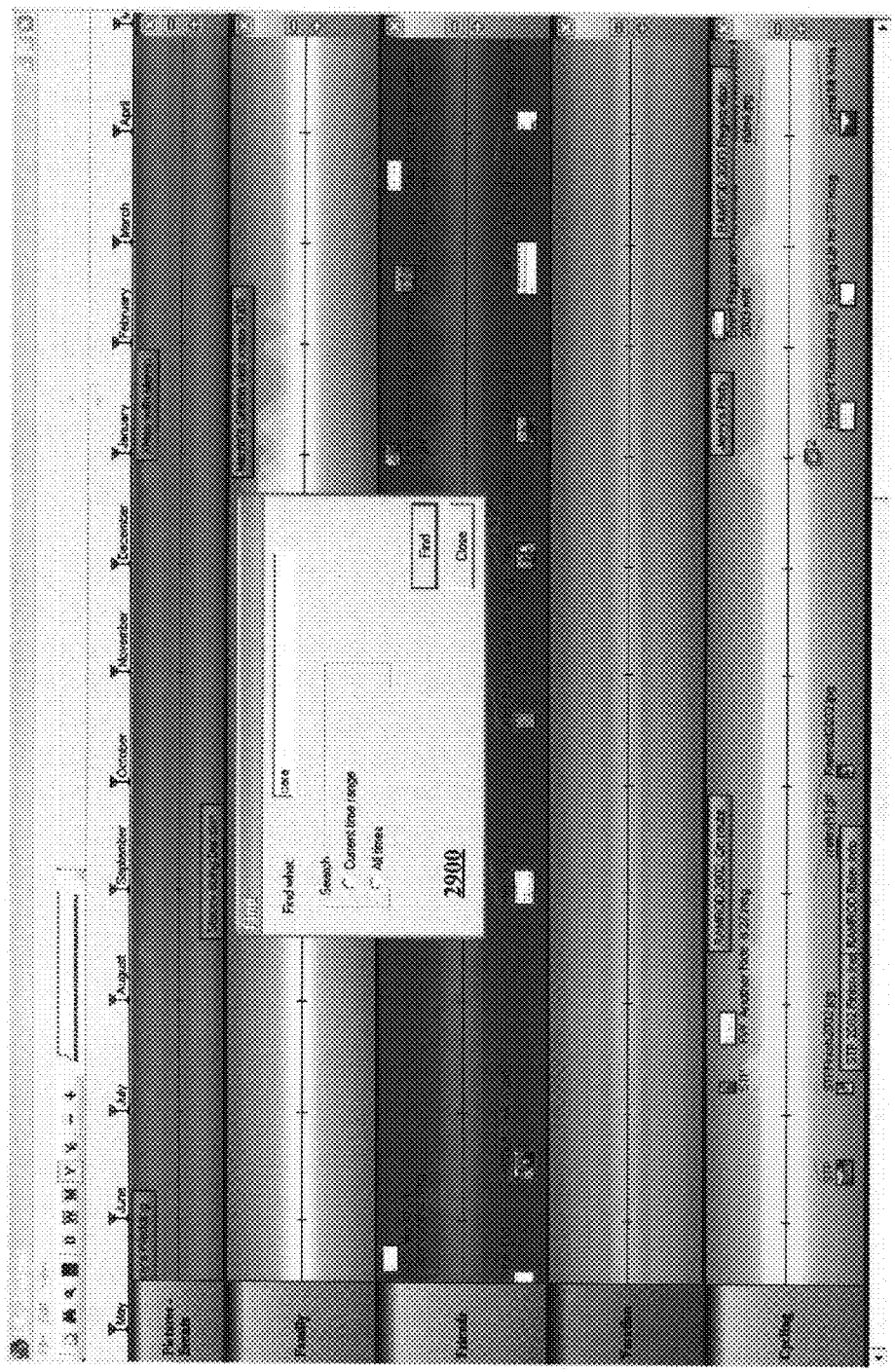
FIGS. 29-30 are screen images of exemplary user-interfaces illustrating the find operation in accordance with an aspect of the subject invention.
Figure 30:
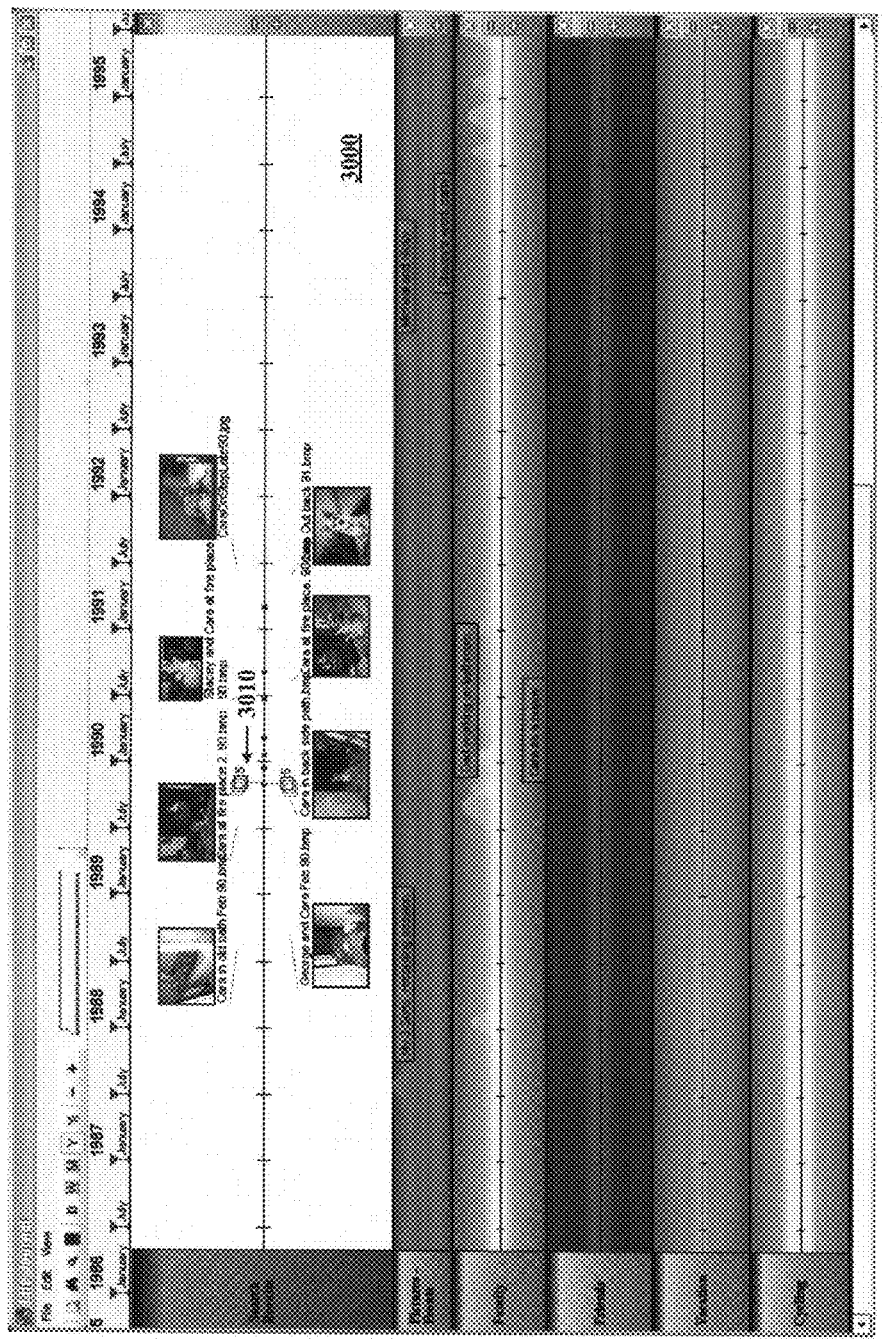

Turning now to FIG. 28, there is illustrated a block diagram of a system 2800 that facilitates finding associated objects and viewing and managing them using a time-based user-interface. The system 2800 is similar to the system 100 in FIG. 1, supra (or FIG. 2, 200; FIG. 5, 500). However, the system 2800 includes a find component 2810 that locates objects from an annotated data store 2820 according to the provided find terms and then displays them in a new and fully operational band. More specifically, the find component looks through metadata of the objects stored in the data store and extracts those objects having metadata that match the find terms. FIGS. 29 and 30 include screen images demonstrating the find operation.

Beginning with FIG. 29, an exemplary find window 2900 is displayed. As can be seen in the window 2900, the user can select at least one other find parameter to obtain his/her desired results in addition to the find term(s). FIG. 30 depicts a new band 3000 introduced on-screen and named "Search Results". The objects found by the find component are arranged in the band according to the time parameter associated therewith. Like any of the bands and their respective objects, this band and/or its objects can also be modified, saved (with a more descriptive name), moved, deleted, and/or manipulated in any other way as desired by the user. Furthermore, the objects in the band retain the same properties as they were assigned in the other bands with which they may be associated or maintained. For example, visibility priorities remain enforce. Thus, some objects (3010) can be compressed even within a search results band. Finally, additional metadata relating to the find terms, for example, can be annotated to the respective objects as a result of being part of a find operation.

Figure 31:
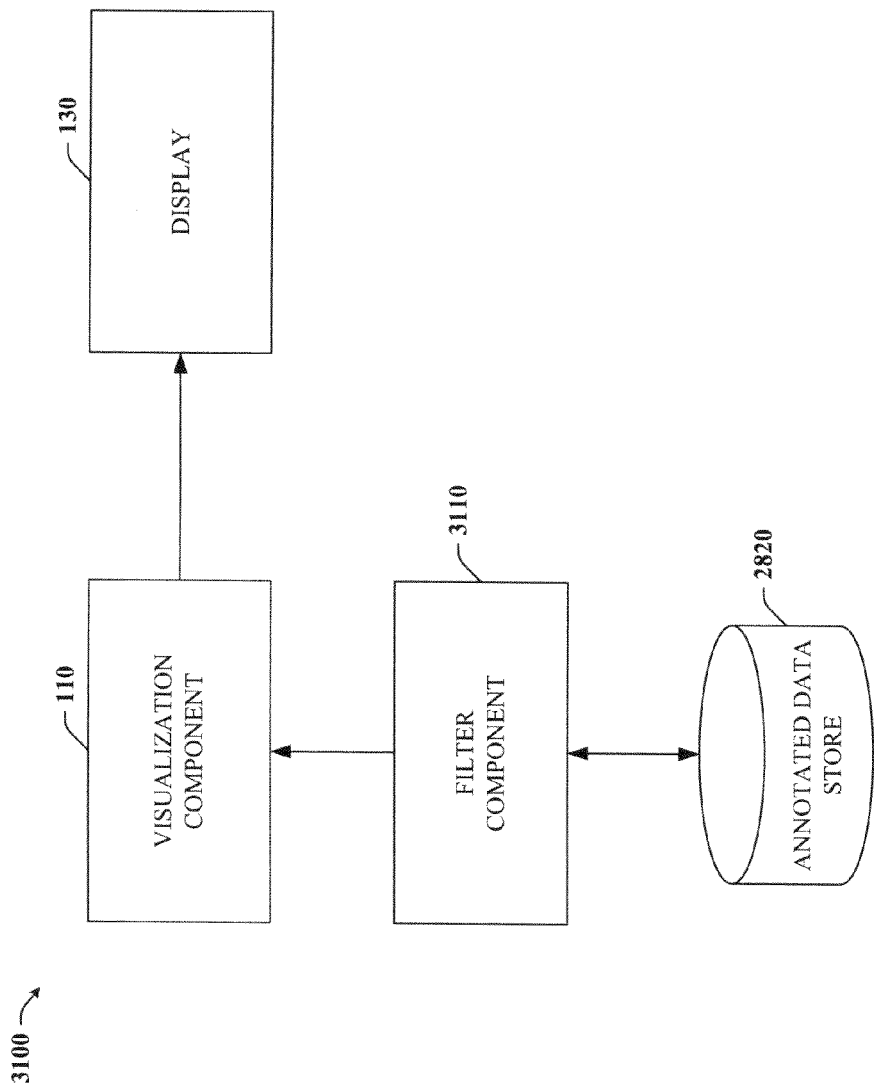
FIG. 31 is a block diagram of an object navigation and management system that facilitates filtering objects in accordance with an aspect of the subject invention.
Figure 32:
FIG. 32 is a screen image of an exemplary user-interface showing a filter menu and band organization in accordance with an aspect of the subject invention.

Moving on to FIG. 31, there is illustrated a block diagram of a system 3100 similar to at least the system 100 in FIG. 1 (also FIG. 2, 200; FIG. 5; 500) but with the incorporation of a filter component 3110. The filter component 3110 can remove undesired objects or bands from the current on-screen view. For example, in a densely populated region of a band, the user may only be interested in seeing documents rather than photos and web page links. Alternatively or in addition, the user may only wish to see objects relating to certain subject matter such as food, parties, or car. In either case, the filter component 3110 filters out the undesired objects to leave only the desired objects visible to the user. Each band can have its own "personal" filter with keywords specific to the band as indicated in FIG. 32. Overall, the use of filters can greatly improve the browsing experience of bands and/or objects and make the user's experience or interaction with his/her objects more meaningful.

FIG. 32 further demonstrates that bands can also be an alternative user interface displayed adjacent to a classic "tree-view" organization 3200 to provide a simultaneous dual view into a group of objects. Objects can be seen arranged alphabetically in the tree control (representing their storage hierarchy) and with a time-based "band" layout next to the tree control. In particular, each band is at least partially organized according to the time parameter but also maintains some hierarchal organization which can be visualized in the more traditional tree-view structure. For example, the band name can represent a primary node and any number of sub-nodes branching down from the primary node can be populated. Thus, the user can view objects within the band and across bands according to associations and relationships based on time and/or importance, for instance; and any time, also view the same objects organized instead in the folder—sub-folder view with substantially less context given to the objects maintained in each folder or sub-folder.

Figure 33:
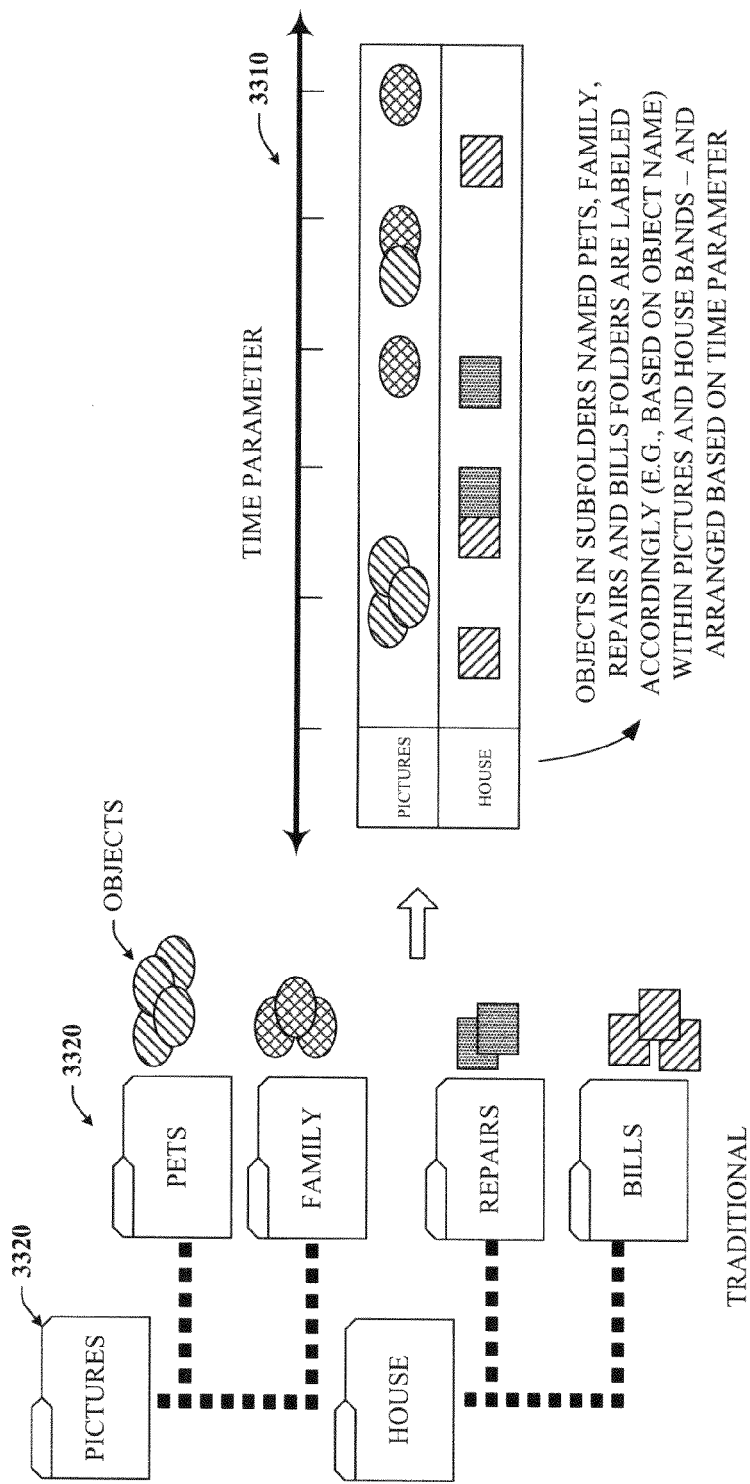
FIG. 33 is a schematic diagram demonstrating the conversion from a traditional tree-structure to a unique time-based band structure in accordance with an aspect of the subject invention.

FIG. 33 provides a schematic representation of the powerful conversion from the traditional tree-structure 3300 to a more dynamic, more interactive, and more informative time-based band structure 3310 as discussed hereinabove in FIGS. 1-32. The schematic representation highlights the fact that objects contained in any particular folder 3320 are essentially hidden from view unless the folder is opened. However, by opening the folder, context surrounding the folder is lost such as where is the folder located with respect to the other folders. Also, the tree-structure is not able to convey relationships between folders or sub-folders and/or the objects contained within.

By contrast, the time-based band structure defines the major nodes into separate bands and any object contained within that major band (e.g., Pictures)—even if in a "sub-folder" (e.g., Pets)—can be viewed with respect to the other objects contained therein. In the time-based band structure 3310, objects can be organized by the time parameter as well as based on their close relationships to other objects in the same band (e.g., clusters). Not only can relationships or associations of objects within each band be recognized, but associations of objects across multiple bands can be realized or discovered as well. Unfortunately, the conventional tree-structure alone cannot provide such meaningful information. Therefore, the tree-view can be displayed simultaneously with the band-view to provide a "picture" of the same objects from two different perspectives. Any edit or change in one of the views can be instantly visible in the other view. The simultaneous (e.g., side by side) view of both can also be useful for visualizing actual storage paths while examining object context to related objects on or along the time line. Alternatively, the views can be toggled between one and the other particularly when one view is preferred over the other or both are not needed at the same time by the user.

Figure 34:
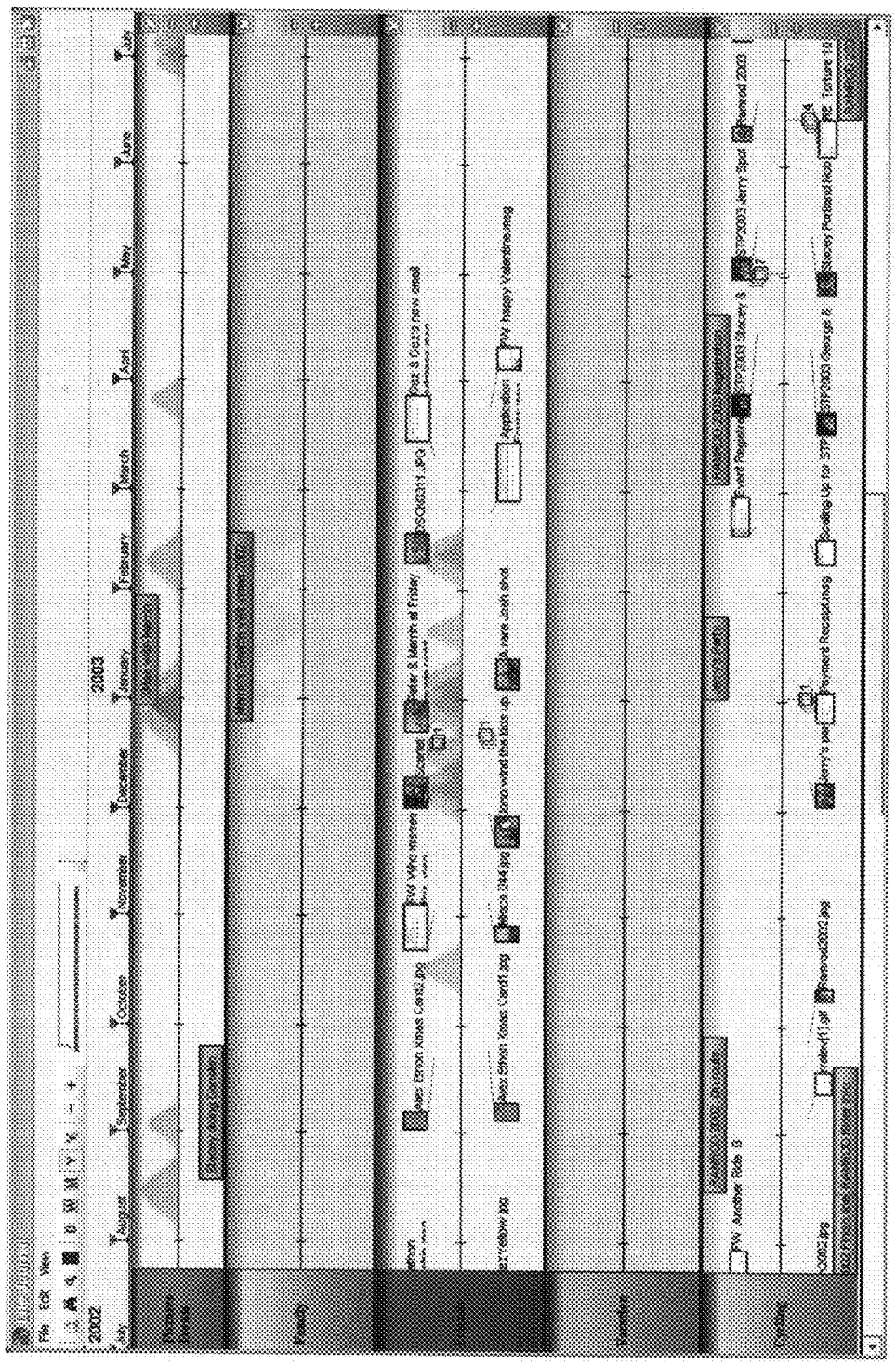
FIG. 34 is a screen image of an exemplary user-interface showing an alternative color scheme in accordance with an aspect of the subject invention.

A few other qualities to note include the fact that the bands can be color-customized according to the user's preferences. For example, the screen image of an exemplary user-interface represented in FIG. 34 indicates a very different color scheme than previously shown in many of the previous screen images.

Figure 35:
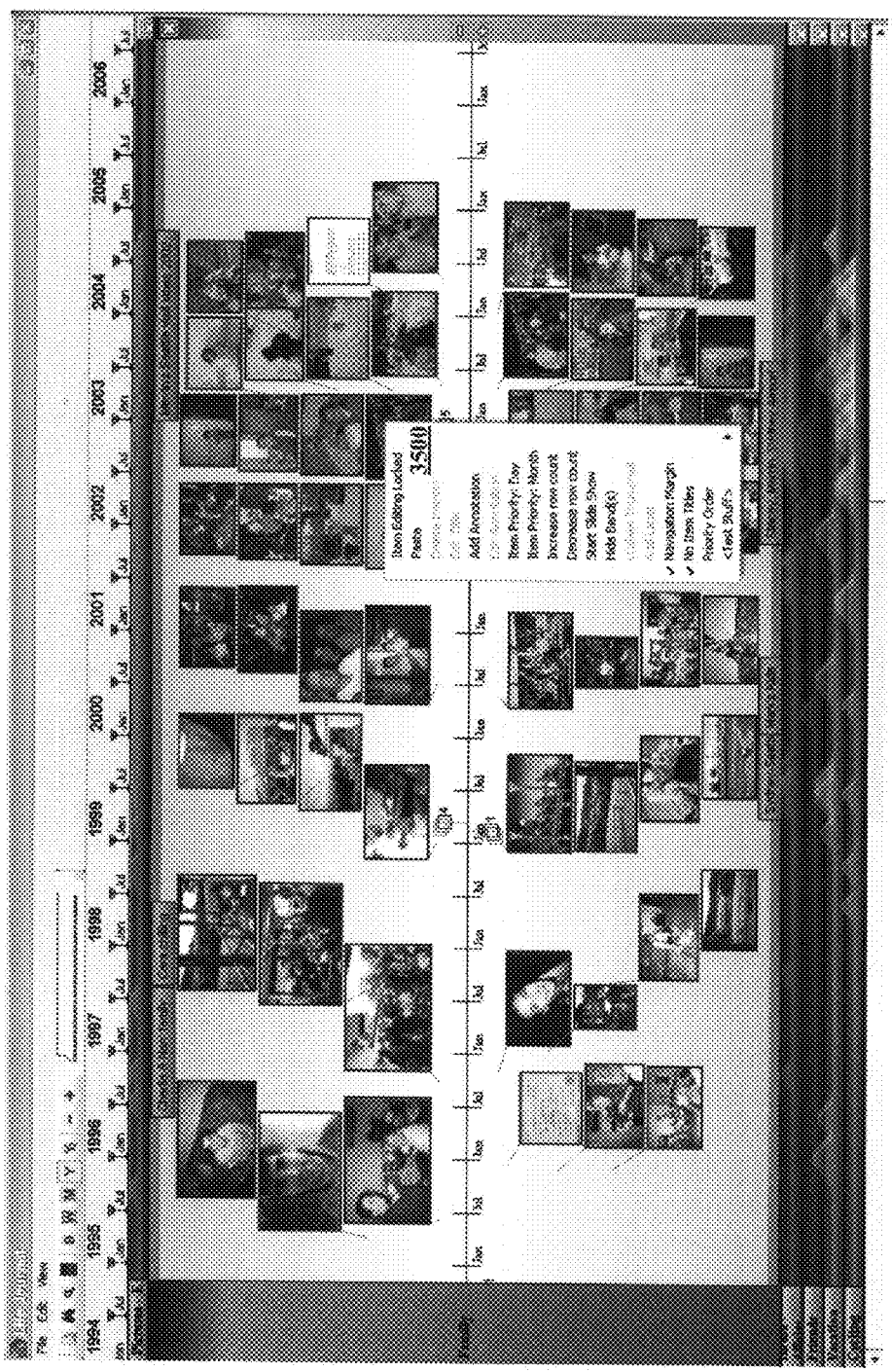
FIG. 35 is a screen image of an exemplary user-interface showing a pop-up menu available at any object or band level in accordance with an aspect of the subject invention.

Within each band and at each object, a menu can be raised or popped up on the screen that provides the user with several different options or actions to take with respect to the object or to the band—depending on where the menu was accessed (e.g., over an object or over band space). FIG. 35 shows an exemplary pop-up menu 3500 with a plurality of options and actions. It should be appreciated that this list is not exhaustive and other options or actions may be included as well.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 36:
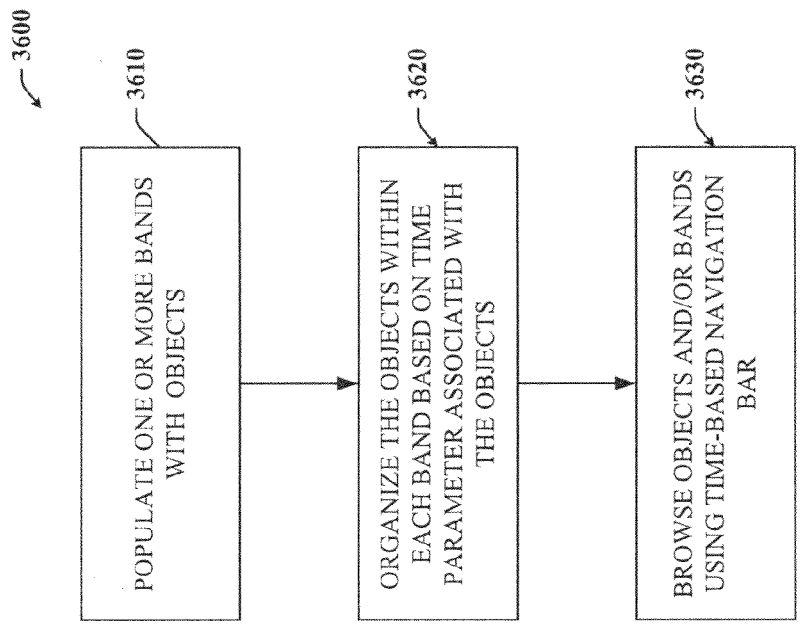
FIG. 36 is a flow chart illustrating an exemplary methodology that facilitates navigating and managing a plurality of objects arranged in a time-based band structure in accordance with an aspect of the subject invention.

Referring now to FIG. 36, there is a flow diagram of an exemplary process 3600 that facilitates managing and navigating among objects based at least in part upon a time parameter. The objects can be organized into definable bands based on subject matter, for example. Recall that objects as displayed on the screen to the user can be ASCII thumbnails of the corresponding files or documents. The thumbnails can be actionable and dynamic and thus change, as the state of the object changes due to modifications or updates.

In addition, the user can modify the content of the respective files by selecting and/or clicking on the thumbnail. That is, the user can annotate or add text or comments directly to the file without actually having to open a separate application to do so. For example, a word processing document can be updated without opening the word processing program and then accessing the document therefrom. Rather, the user can simply move the cursor to the relevant line or field on the document and begin entering new data into the document. Furthermore, any modifications can be saved as well—mitigating the need to jump between several different applications and the bands. Thus, the user's efficiency and overall experience with managing and viewing files, documents, photos, web pages, etc. can be substantially increased.

The process 3600 involves populating one or more bands with the relevant objects at 3610. The objects can include such items as documents, reports, pictures, shows/programs, sound or audio, web pages, hyperlinks, music, etc. At 3620, the objects can be organized within the respective bands based on a time parameter such as a date or time of day associated with each object. The time parameter for each object can be extracted from the object's metadata or explicitly entered by the user.

At 3630, the objects and/or bands can be browsed using a time-based navigation bar. The time-based navigation bar facilitates which range of time is currently being viewed on the screen. The user can navigate to different time ranges by scrolling along the navigation bar using a pointing device to click, hold, and scroll, for instance. In addition, the user can navigate to different time ranges by moving the pointing device in the relevant direction (e.g., to the right or left) over any band. As the time range changes on the screen so too does the view of the bands to coordinate with the current time range. As can be imagined, the movements in and out of bands and through various time periods along the time line navigation bar are rather fluid and effortless in practice.

Figure 37:
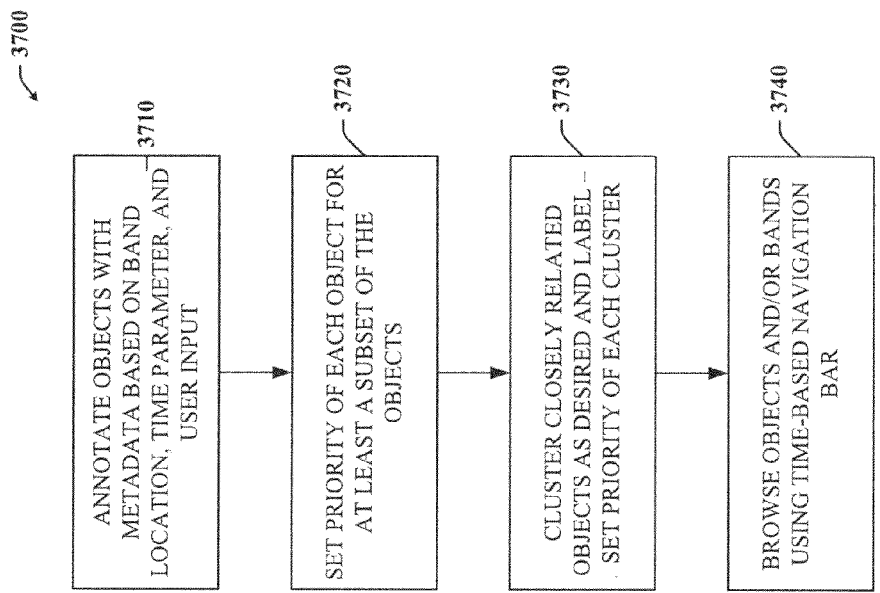
FIG. 37 is a flow chart illustrating an exemplary methodology that facilitates annotating and clustering objects in accordance with an aspect of the subject invention.

Referring now to FIG. 37, there is illustrated a flow diagram of an exemplary process 3700 that facilitate management and navigation of objects categorized into any number of bands. When managing objects such as files, photos, and other documents obtained or collected over any period of time (e.g., professional or personal objects), metadata associated with each object can be important to increasing efficiencies such as sorting objects, finding objects, grouping objects, and/or discovering associations between objects. Thus, according to the process 3700, objects can be annotated with metadata such as the name of the band in which it is located, a time parameter (e.g., time of day and/or date), and other user input at 3710. For example, the user can identify the specific subject matter of the object and annotate the object accordingly. Any one object can be located in more than one band; thus modifications or updates made to the object or its metadata in one band can also be reflected in the object when viewed in another band. In short, the multiple copies of an object are essentially linked to one another. The annotations can be made via text, pen, or voice.

In addition, a value or level of importance can be set for each object at 3720. The importance level can be another form of metadata which is employed to indicate the degree of visibility of the object when screen space is limited and the object is in a densely populated region of the band. For example, imagine that the viewable space within a band is congested with dozens or hundreds of objects—perhaps due to the current zoom level or an only partially expanded band. Because the available viewing space is limited, the more important objects can be selected and thus made visible to the user. Objects deemed less important can be compressed, but not completely hidden from view. An icon or symbol can be used to indicate that Q objects (e.g., 1 or 5, etc.) exist at the relevant time or date in the band. To view these compressed objects, the user can simply zoom in further until enough space becomes available to show the objects (e.g., based on the objects' importance) or can click directly on the icon.

In some cases, some objects may be so closely related that the user may wish to cluster them into sub-groups within the band. The process can also be set to do this in an automated but smart fashion using artificial intelligence and/or any number of inference schemes. Hence, at 3730, closely related objects can be clustered and optionally labeled. Each cluster can also be assigned a level or a value of importance. With clusters, the cluster label can remain visible even when the band is compressed and no distinct objects can be seen. Because it is feasible that more than one labeled cluster can be found at a close or the same time, labels or clusters with higher priorities can overlap those with lesser priorities. The cluster labels can also overlap in a transparent manner other objects such that at least a portion of the object and the label are still recognizable and discernible. Finally, at 3740, the objects and/or bands can be browsed once again by using the time based navigation bar (e.g., time-line tool).

Figure 38:
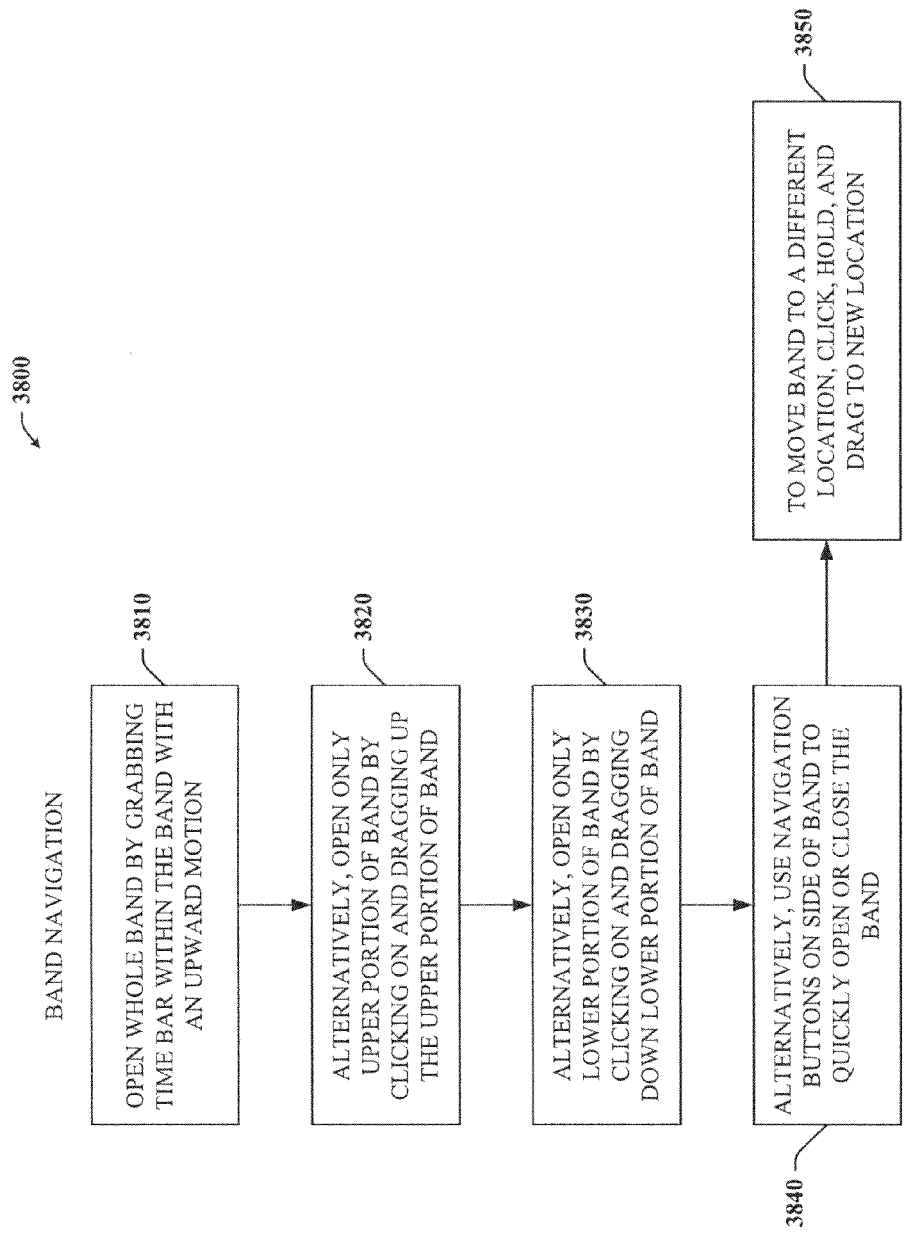
FIG. 38 is a flow chart illustrating an exemplary methodology that facilitates band navigation in accordance with an aspect of the subject invention.

Turning now to FIG. 38, there is depicted a flow diagram of an exemplary band navigation process 3800 in accordance with an aspect of the subject invention. The band navigation process 3800 involves such operations as opening (expanding) or closing (compressing) the band. At 3810, using a pointing device, a user can grab the time bar within the band with an upward motion to open the whole band (e.g., upper and lower). Alternatively at 3820, the user may desire to only open an upper portion of the band. To do so, the user can click and drag an area of the upper portion up. The lower portion (below the bar) remains as-is and unaffected.

On the other hand, the user may wish to only expand the lower portion of the band. Thus, at 3830, only the lower portion can be expanded by clicking on any area of the lower portion and dragging down. Again, the upper portion remains as-is and unaffected. At 3840, some users may wish to use other navigational buttons or tools located on the display to expand or compress or otherwise navigate the bands (3840).

The bands can also be fixed to their location such that they are unaffected when the user scrolls through the bands (e.g., vertical scrolling such that a different band may appear at the top of the stack of bands). Alternatively, however, a user may want to move a band to a different location on the display—perhaps apart from any other bands. This can be accomplished in part by clicking, holding, and then dragging or throwing (gesturing) the band to its desired location (3850) and/or creating a new window to view and navigate the band.

Figure 39:
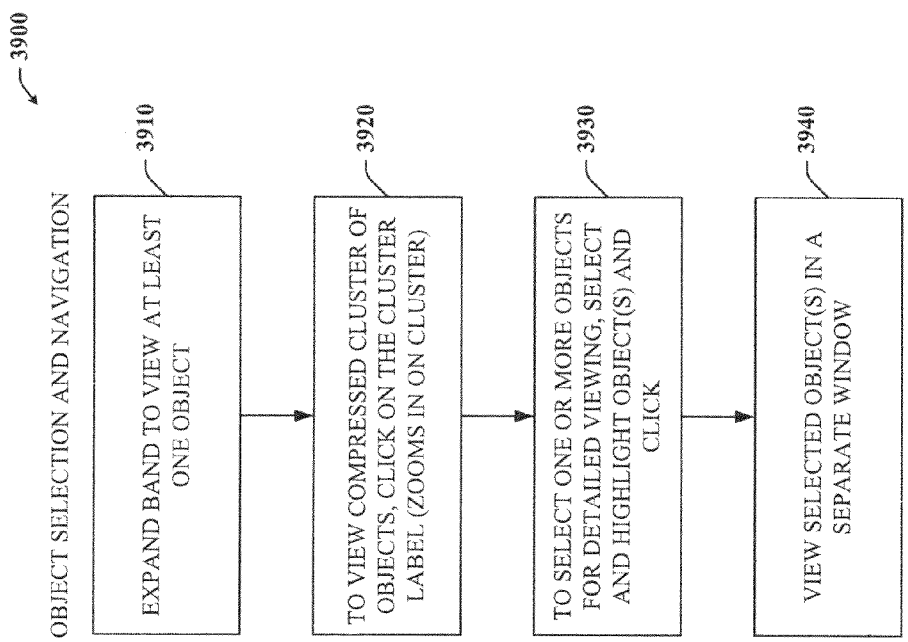
FIG. 39 is a flow chart illustrating an exemplary methodology that facilitates band navigation in accordance with an aspect of the subject invention.

Referring now to FIG. 39, there is shown a flow diagram of an exemplary object selection and navigation process 3900 in accordance with an aspect of the subject invention. The process 3900 involves various techniques to employ to facilitate navigating and managing objects maintained within bands. At 3910, a band can be expanded to reveal and make visible at least one object. When a cluster of objects is compressed and only the label is visible, the user can click on the label to effect a zoom-in action on the cluster (3920).

At some time, the user may want to view one or more objects of interest in much greater detail or perform other operations on the objects. To select one or more objects, the user can highlight the desired objects and then click on the highlighted box surrounding the objects. As a result, the selected objects can be viewed in a separate window. Objects appearing in a separate window can also display additional information such other objects related to the particular object as well as the most relevant metadata associated with each selected object (e.g., name, file size, path name, etc.). The user may also be given the option to view the selected objects as a movie or slide show, in which the speed of the show can be adjusted by the user.

Though not depicted in the figure, other navigational techniques can be employed to enhance or optimize the visibility of the objects, especially the objects of interest to the user. For example, each band can make use of at least one filter. By using a determined set of keywords or metadata terms, the user can filter objects out of view by the type of object or by the subject matter of the object, for example. This can make more space available to view the objects of interest and mitigate congestion in or a cluttered view of the band. In some instances, objects of interest may be distributed or dispersed among several bands. A user can locate them by utilizing a find command. The corresponding results can be visualized in a new band. This band, like any other, can be saved, moved, and/or deleted.

Figure 40:
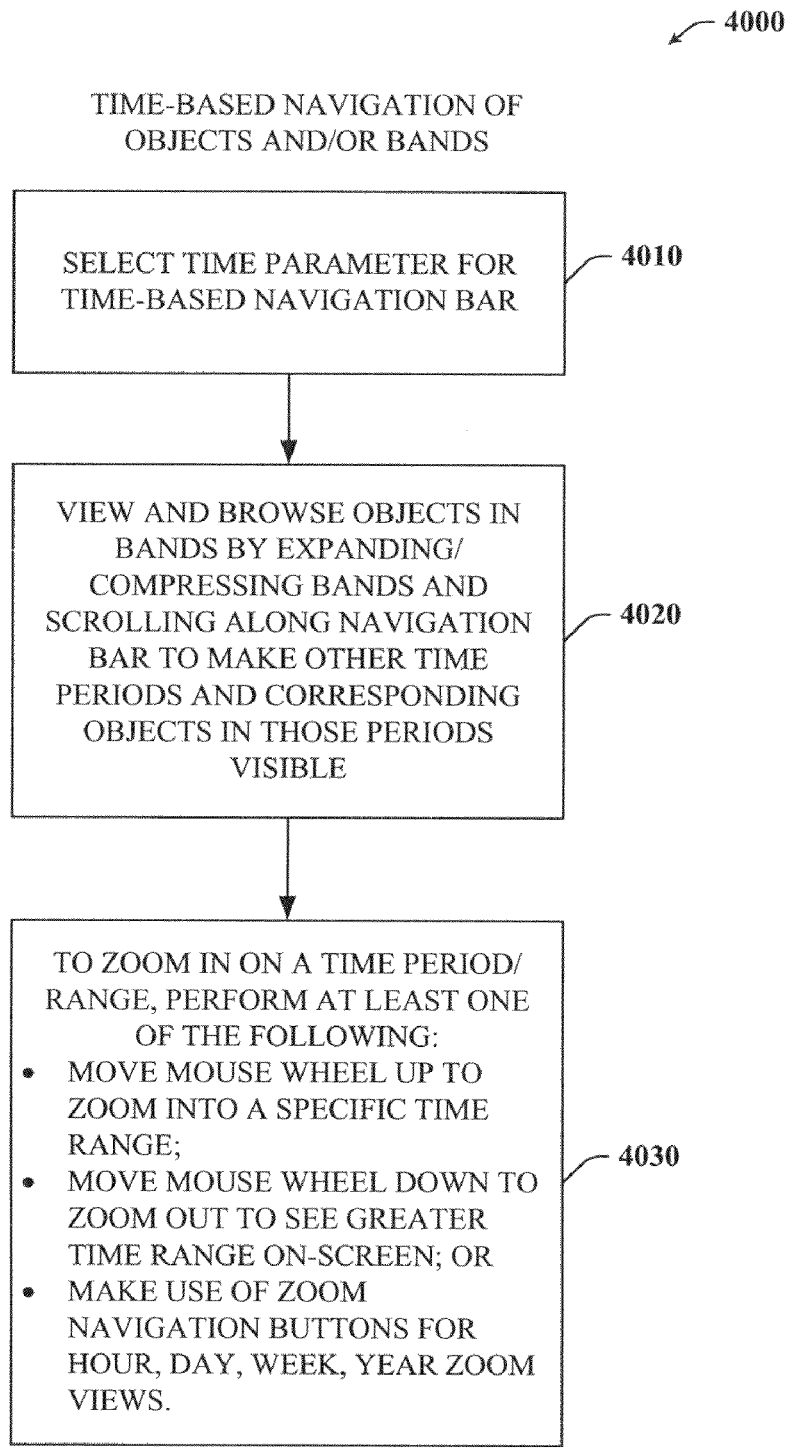
FIG. 40 is a flow chart illustrating an exemplary methodology that facilitates time-based navigation of objects and bands in accordance with an aspect of the subject invention.

Turning now to FIG. 40, there is illustrated a flow diagram of an exemplary time-based navigation process 4000 which can be employed in connection with objects and/or bands in accordance with an aspect of the subject invention. The process 4000 involves selecting a time parameter (e.g., years, year, month, week, day, hour, etc.) in which to view the bands and objects therein for the time-based navigation bar at 4010. The location of the bar may vary; however, in one scheme, the bar is located above the stack of bands and can start at the "beginning of time" (e.g., person's birth or other significant starting point) and then continue on nearly infinitely into the future. Thus, objects can be found at time ranges dating back in time from the present as well as in the future. Moreover, some level of meaningful context is maintained throughout the retention of the object in the band regardless of the object's age or time of occurrence. Other object or data management systems or techniques cannot or do not support this rich and navigable environment.

Once a time parameter is selected, the user can view and browse the objects in the bands by expanding or compressing one or more bands and moving the navigation bar to the left or to the right to view different time ranges and different objects that fall within those time ranges (4020). Finally, to zoom between time ranges (e.g., from year to month or from year to week), the user can perform at least one of the following: using a wheel-enabled mouse, the mouse wheel can be moved up to zoom into a specific time range or down to zoom out of to see a greater time range on the screen; or the user make use of various zoom navigation buttons located on the screen to select a particular view (e.g., hour, day, week, month, year or years view) (4030).

Figure 41:
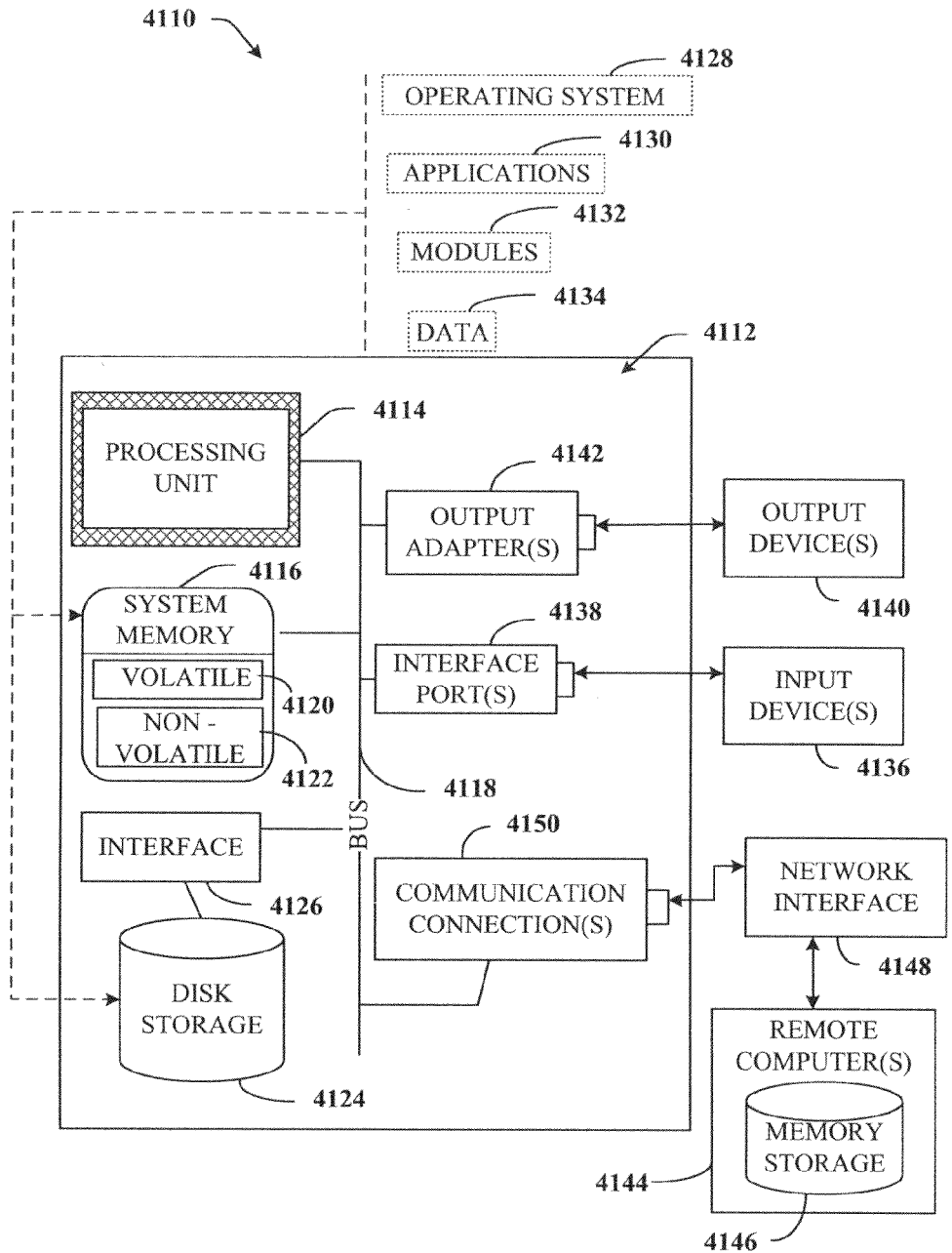
FIG. 41 illustrates an exemplary environment for implementing various aspects of the invention.

In order to provide additional context for various aspects of the subject invention, FIG. 41 and the following discussion are intended to provide a brief, general description of a suitable operating environment 4110 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 4110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 41, an exemplary environment 4110 for implementing various aspects of the invention includes a computer 4112. The computer 4112 includes a processing unit 4114, a system memory 4116, and a system bus 4118. The system bus 4118 couples system components including, but not limited to, the system memory 4116 to the processing unit 4114. The processing unit 4114 can be any of various available processors. Dual microprocessors and other multi-processor architectures also can be employed as the processing unit 4114.

The system bus 4118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 4116 includes volatile memory 4120 and nonvolatile memory 4122. The basic input/output system (BIOS), containing the basic routines to transfer information between elements within the computer 4112, such as during start-up, is stored in nonvolatile memory 4122. By way of illustration, and not limitation, nonvolatile memory 4122 can include read only memory (ROM), programmable ROM (PROM), electrically programmable ROM (EPROM), electrically erasable ROM (EEPROM), or flash memory. Volatile memory 4120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4112 also includes removable/nonremovable, volatile/nonvolatile computer storage media. FIG. 41 illustrates, for example a disk storage 4124. Disk storage 4124 includes, but is not limited to, devices like a magnetic disk drive, floppy disk drive, tape drive, Jaz drive, Zip drive, LS-100 drive, flash memory card, or memory stick. In addition, disk storage 4124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4124 to the system bus 4118, a removable or non-removable interface is typically used such as interface 4126.

It is to be appreciated that FIG. 41 describes software that acts as an intermediary between users and the basic computer resources described in suitable operating environment 4110. Such software includes an operating system 4128. Operating system 4128, which can be stored on disk storage 4124, acts to control and allocate resources of the computer system 4112. System applications 4130 take advantage of the management of resources by operating system 4128 through program modules 4132 and program data 4134 stored either in system memory 4116 or on disk storage 4124. It is to be appreciated that the subject invention can be implemented with various operating systems or combinations of operating systems.

A user enters commands or information into the computer 4112 through input device(s) 4136. Input devices 4136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4114 through the system bus 4118 via interface port(s) 4138. Interface port(s) 4138 include, for example, a serial port, a parallel port, a game port, and a universal serial bus (USB). Output device(s) 4140 use some of the same type of ports as input device(s) 4136. Thus, for example, a USB port may be used to provide input to computer 4112, and to output information from computer 4112 to an output device 4140. Output adapter 4142 is provided to illustrate that there are some output devices 4140 like monitors, speakers, and printers among other output devices 4140 that require special adapters. The output adapters 4142 include, by way of illustration and not limitation, video and sound cards that provide a means of connection between the output device 4140 and the system bus 4118. It should be noted that other devices and/or systems of devices provide both input and output capabilities such as remote computer(s) 4144.

Computer 4112 can operate in a networked environment using logical connections to one or more remote computers, such as remote computer(s) 4144. The remote computer(s) 4144 can be a personal computer, a server, a router, a network PC, a workstation, a microprocessor based appliance, a peer device or other common network node and the like, and typically includes many or all of the elements described relative to computer 4112. For purposes of brevity, only a memory storage device 4146 is illustrated with remote computer(s) 4144. Remote computer(s) 4144 is logically connected to computer 4112 through a network interface 4148 and then physically connected via communication connection 4150. Network interface 4148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4150 refers to the hardware/software employed to connect the network interface 4148 to the bus 4118. While communication connection 4150 is shown for illustrative clarity inside computer 4112, it can also be external to computer 4112. The hardware/software necessary for connection to the network interface 4148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates managing a life journal comprising:
   at least one data store that stores a plurality of objects, the objects relating to a plurality of aspects of a user's life;
   a visualization component that generates a plurality of bands, wherein the bands correspond to a subject matter and are positioned relative to a time-line bar to facilitate organizing and maintaining the user's objects in a chronological and subject-matter manner for easier user review and management, the visualization component scales a size of non-viewed bands based at least in part upon a level of zoom detail on a portion of the life journal, wherein a textual annotation is automatically generated for corresponding non-textual content associated with the non-viewed bands upon reaching a predetermined zoom level; and
   a display that displays the plurality of bands to the user.

2. The system of claim 1, the objects comprise at least one of pictures, messages, documents, audio, text, blog or diary-oriented content, web pages, video, and television programs and/or any combination thereof that are captured by any electronic device.

3. The system of claim 1, the time-line bar begins and ends at any time parameter as desired by the user, such that the user can view objects as they take place in the user's life in a past time parameter and in a future time parameter.

4. The system of claim 3, the time parameter comprises a date.

5. The system of claim 3, the time parameter further comprises a time of day.

6. The system of claim 1, further comprising an annotation component that annotates objects with metadata, the metadata comprising at least one of text, audio, video, and other media types and relating to content of the objects, time parameter of the objects, and other information as entered by the user.

7. The system of claim 6, the annotation component comprises a recognition component that makes use of at least one recognition technique to facilitate annotating the objects with consistent metadata and analyze and store parameters to correlate objects.

8. The system of claim 7, the at least one recognition technique comprises facial recognition, pattern recognition, audio pattern recognition, video pattern recognition, and optical character recognition.

9. The system of claim 1, further comprising one or more navigation controls that allow the user to navigate to various time parameters along the time-line bar to view any activity across the bands in the user's life at the various time parameters.

10. The system of claim 9, at least a subset of the navigation controls allows the user to view the activity at multiple levels of zoom detail.

11. A method that facilitates navigating a life journal comprising:
    inputting a plurality of objects, the objects relating to a plurality of aspects of a user's life;
    creating a plurality of bands, wherein each band corresponds to a subject matter and are positioned relative to a time-line bar to facilitate organizing and maintaining the user's objects in a chronological and subject-matter manner;
    modifying a size of non-viewed bands based at least in part upon a level of zoom detail on a portion of the life journal, wherein a textual annotation is automatically generated for corresponding non-textual content associated with the non-viewed bands upon reaching a predetermined zoom level; and
    displaying the plurality of bands to the user.

12. The method of claim 11, further comprising selecting a band in which at least one object belongs based on the subject-matter of the object and band.

13. The method of claim 12, further comprising positioning the object in the band along the time-line bar based on the time parameter of the object.

14. The method of claim 11, further comprising navigating along the time-line bar to view a plurality of time parameters and the respective objects occurring at the time parameters across one or more of the bands.

15. The method of claim 11, further comprising using one or more navigation controls to zoom to multiple levels of detail of any band or object.

16. The method of claim 11, the objects comprise at least one of pictures, messages, documents, audio, web pages, video, and television programs.

17. The method of claim 11, the time-line bar begins and ends at any time parameter as desired by the user, such that the user can view objects as they take place in the user's life in a past time parameter and in a fixture time parameter.

18. The method of claim 17, the time parameter comprises a date.

19. The method of claim 17, the time parameter further comprises a time of day.

20. The method of claim 11, further comprising performing at least one of the following:
- archiving at least a portion of the life journal in a remote location to facilitate optimizing storage capacity;
- compressing at least a portion of the life journal based at least in part upon viewer permissions to facilitate user privacy;
- publishing at least a portion of the life journal to another media type, the portion comprising at least a portion of at least one band; and
- displaying the life journal on any viewable screen with which the user can interact in at least one of a wired or wireless manner.

* * * * *

UNITED STATES PATENT AND TRADEMARK OFFICE
CERTIFICATE OF CORRECTION

| | | |
|---|---|---|
| PATENT NO. | : 7,421,449 B2 | Page 1 of 1 |
| APPLICATION NO. | : 11/033684 | |
| DATED | : September 2, 2008 | |
| INVENTOR(S) | : Williams et al. | |

It is certified that error appears in the above-identified patent and that said Letters Patent is hereby corrected as shown below:

In column 23, line 18, in Claim 17, delete "fixture" and insert -- future --, therefor.

Signed and Sealed this
Third Day of May, 2011

David J. Kappos
*Director of the United States Patent and Trademark Office*